(12) United States Patent
Walsh et al.

(10) Patent No.: US 12,097,159 B2
(45) Date of Patent: Sep. 24, 2024

(54) TEXTILE ACTUATORS

(71) Applicant: President and Fellows of Harvard College, Cambridge, MA (US)

(72) Inventors: Conor J. Walsh, Cambridge, MA (US); Ciaran O'Neill, Cambridge, MA (US); Nathan Phipps, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 763 days.

(21) Appl. No.: 16/614,862

(22) PCT Filed: May 31, 2018

(86) PCT No.: PCT/US2018/035483
§ 371 (c)(1),
(2) Date: Nov. 19, 2019

(87) PCT Pub. No.: WO2018/222930
PCT Pub. Date: Dec. 6, 2018

(65) Prior Publication Data
US 2020/0170873 A1     Jun. 4, 2020

Related U.S. Application Data

(60) Provisional application No. 62/541,299, filed on Aug. 4, 2017, provisional application No. 62/513,256, filed on May 31, 2017.

(51) Int. Cl.
*A61H 1/00* (2006.01)
*A41D 1/04* (2006.01)
(Continued)

(52) U.S. Cl.
CPC ............. *A61H 1/0274* (2013.01); *A41D 1/04* (2013.01); *B25J 9/0006* (2013.01); *B25J 9/1694* (2013.01);
(Continued)

(58) Field of Classification Search
CPC .......... A61H 1/0274; A61H 2201/0103; A61H 2201/1238; A61H 2201/1635;
(Continued)

(56) References Cited

U.S. PATENT DOCUMENTS 3,638,536 A * 2/1972 Kleinwachter ....... F15B 15/103
92/92
4,274,399 A * 6/1981 Mummert ............ A61H 1/0288
128/DIG. 20
(Continued)

FOREIGN PATENT DOCUMENTS

WO    2012148472 A2    11/2012
WO    2013130760 A2    9/2013
(Continued)

OTHER PUBLICATIONS

European Patent Office, Partial Supplementary European Search Report for European Application No. 18809543.4 (corresponding European application) (dated Feb. 11, 2021).
(Continued)

*Primary Examiner* — Michael R Reid
*Assistant Examiner* — Tyler A Raubenstraw
(74) *Attorney, Agent, or Firm* — Modern Times Legal; Robert J. Sayre

(57) ABSTRACT

A textile actuator worn by a user comprises a textile envelope that defines a chamber made fluid-impermeable by a fluid-impermeable bladder contained in the textile envelope and/or a fluid-impermeable structure incorporated into the textile envelope. The textile envelope has a pre-determined geometry that produces an equilibrium state at a non-180-angle displacement and that stops further displacement upon pressurization of the chamber and prevents over-extension the joint. A fluid is delivered into or out of the chamber to displace the textile envelope primarily by transitioning from
(Continued)

an uninflated state to the pre-determined geometry due to displacement of the textile envelope rather than via stretching or contraction of the textile envelope. When actuated, the textile actuator (a) displaces a body segment of the user and/or (b) supports and holds the body segment of the user in place.

36 Claims, 25 Drawing Sheets

(51) Int. Cl.
    *A61H 1/02*     (2006.01)
    *B25J 9/00*     (2006.01)
    *B25J 9/16*     (2006.01)
    *F15B 15/10*     (2006.01)

(52) U.S. Cl.
    CPC .... *F15B 15/103* (2013.01); *A61H 2201/0103* (2013.01); *A61H 2201/1238* (2013.01); *A61H 2201/1635* (2013.01); *A61H 2201/165* (2013.01); *A61H 2201/1659* (2013.01); *A61H 2201/5058* (2013.01)

(58) Field of Classification Search
    CPC ...... A61H 2201/165; A61H 2201/1659; A61H 2201/0281; A61H 1/0277; A61H 1/0285; A61H 2201/1246; A41D 1/04; A41D 1/00; B25J 9/0006; B25J 9/1694; F15B 15/103; F15B 15/00–2892
    See application file for complete search history.

(56) References Cited

U.S. PATENT DOCUMENTS

| | | | |
|---|---|---|---|
| 5,033,457 A * | 7/1991 | Bonutti | A61F 5/01 601/33 |
| 5,711,757 A * | 1/1998 | Bryant | A61H 1/02 601/150 |
| 5,937,732 A | 8/1999 | Homann | |
| 9,138,368 B2 * | 9/2015 | Yamamoto | A61H 1/0274 |
| 9,464,642 B2 * | 10/2016 | Ilievski | F15B 15/10 |
| 9,492,930 B2 * | 11/2016 | Galloway | B25J 15/12 |
| 9,506,455 B2 * | 11/2016 | Mazzeo | F03G 7/06 |
| 2007/0233279 A1 * | 10/2007 | Kazerooni | A61H 1/024 623/24 |
| 2015/0090113 A1 * | 4/2015 | Galloway | B25J 9/142 92/48 |
| 2015/0173993 A1 | 6/2015 | Walsh et al. | |
| 2015/0224012 A1 * | 8/2015 | Wright | A61H 9/0078 601/150 |
| 2016/0252111 A1 * | 9/2016 | Ball | F15B 15/103 92/47 |
| 2016/0263751 A1 | 9/2016 | Galloway | |
| 2016/0278948 A1 † | 9/2016 | Piercy | |
| 2017/0027735 A1 * | 2/2017 | Walsh | A61F 5/0123 |
| 2017/0049164 A1 * | 2/2017 | Gruentzig | A41D 1/002 |
| 2017/0128237 A1 | 5/2017 | Rouse et al. | |
| 2017/0202724 A1 | 7/2017 | De Rossi et al. | |
| 2017/0258672 A1 * | 9/2017 | Wennen | A61H 9/0078 |
| 2018/0056104 A1 | 3/2018 | Cromie et al. | |
| 2018/0079071 A1 * | 3/2018 | Griffith | A61H 1/0244 |
| 2018/0296425 A1 † | 10/2018 | Lamb | |

FOREIGN PATENT DOCUMENTS

| | | | |
|---|---|---|---|
| WO | 2015066143 A1 | 5/2015 | |
| WO | 2015157621 A1 | 10/2015 | |
| WO | 2017120314 A1 | 7/2017 | |
| WO | 2017160751 A1 | 9/2017 | |
| WO | WO-2018122106 A1 * | 7/2018 | A61H 1/024 |

OTHER PUBLICATIONS

Hong Kai Yap, et al., "A Fully Fabric-Based Bidirectional Soft Robotic Glove for Assistance and Rehabilitation of Hand Impaired Patients," 2 IEEE Robotics and Automation Letters 1383-1390 (Jul. 2017).

* cited by examiner
† cited by third party

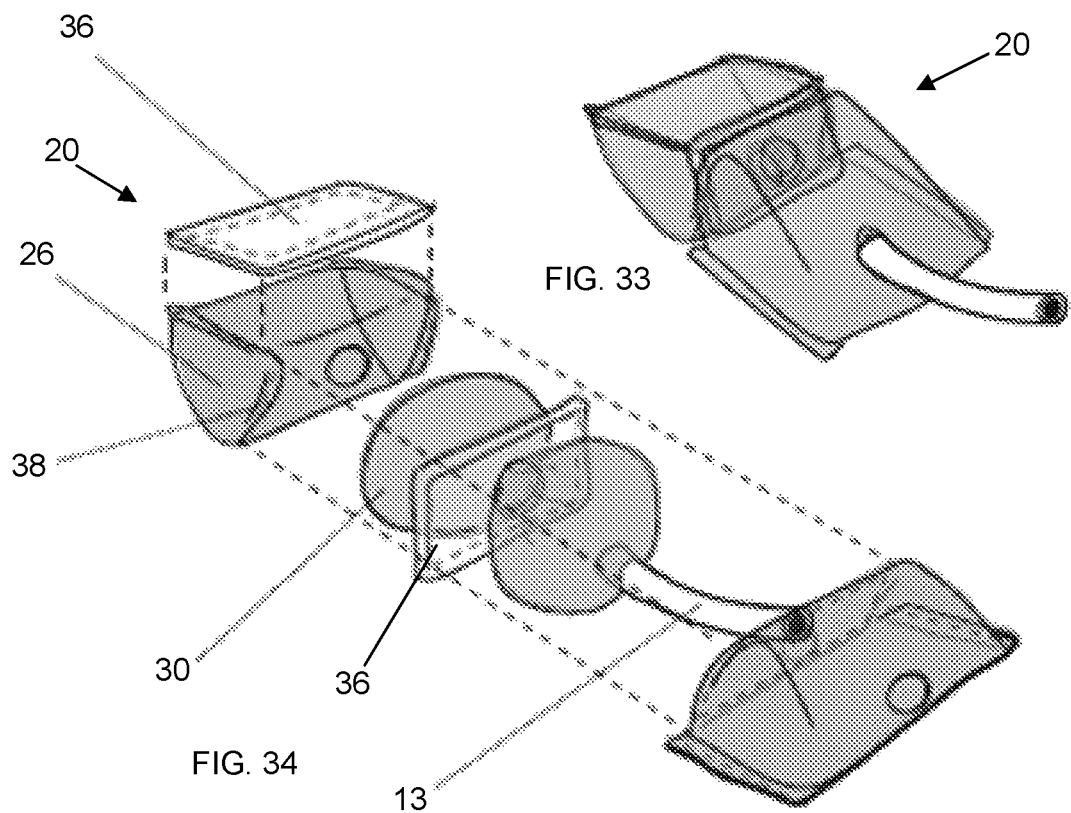
FIG. 33
FIG. 34
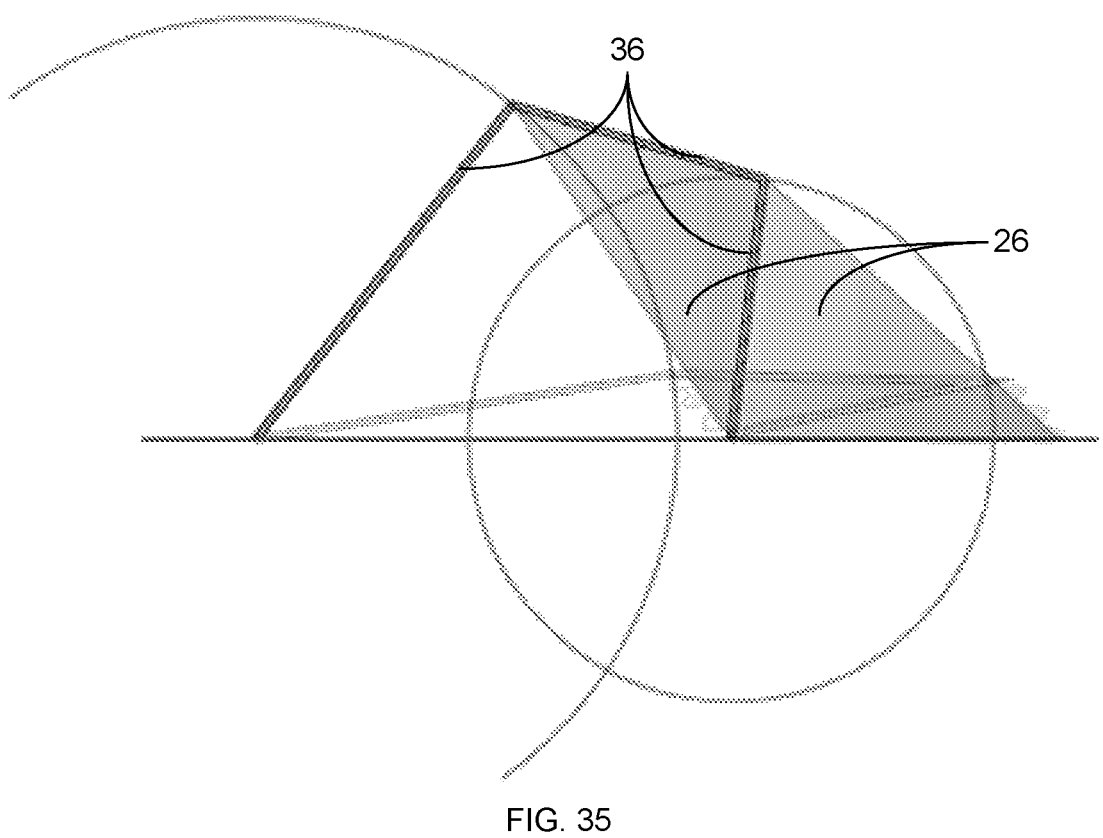
FIG. 35

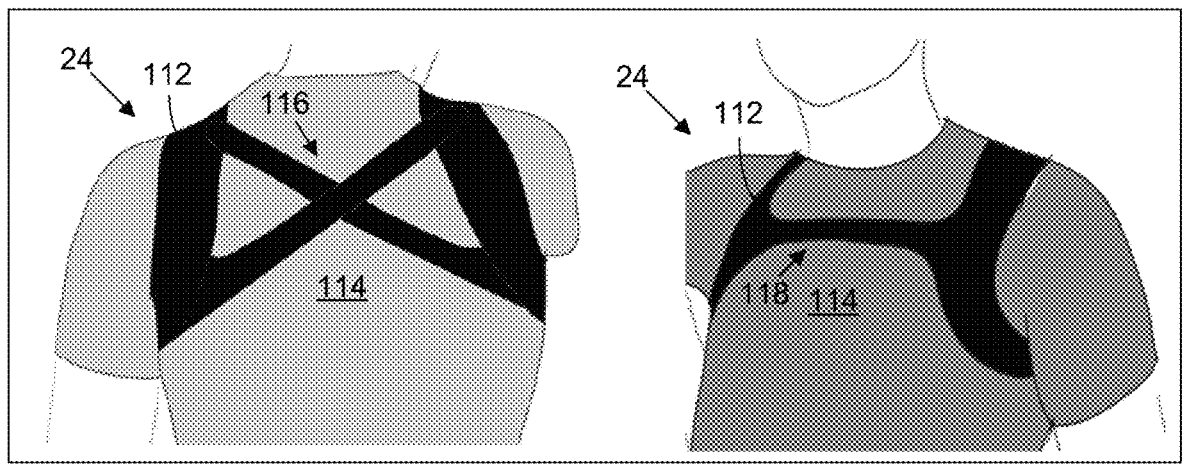
FIG. 70
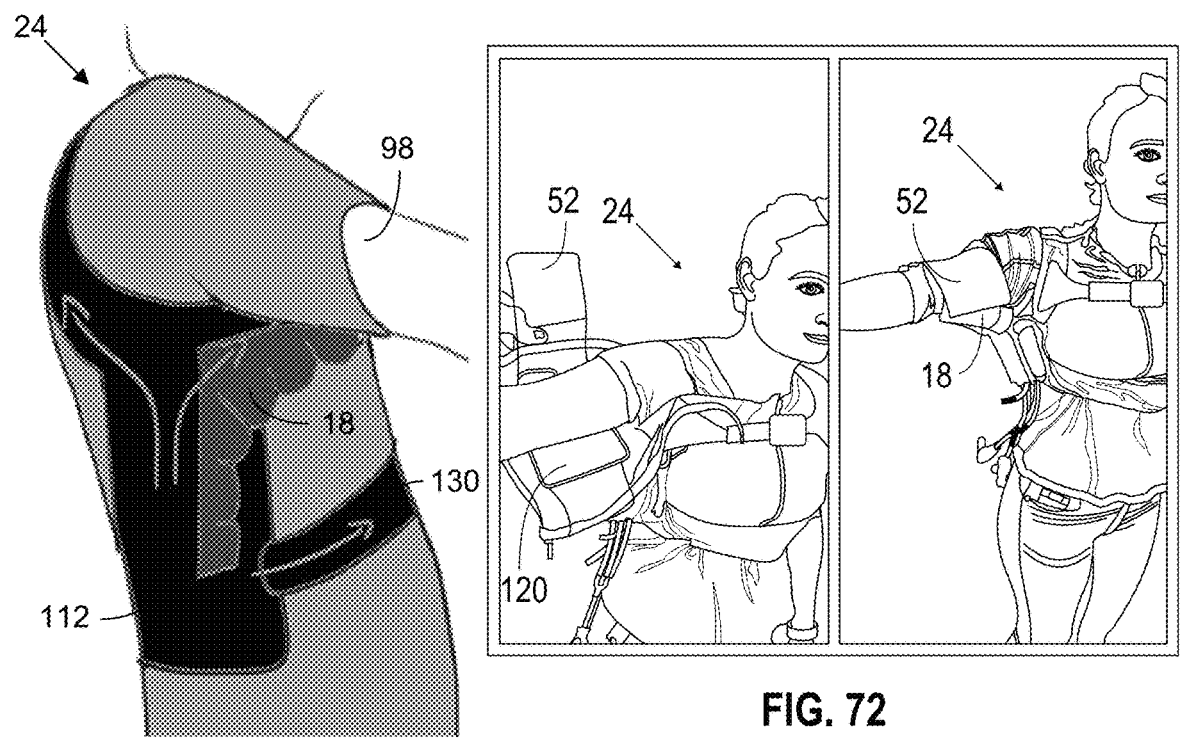
FIG. 71
FIG. 72

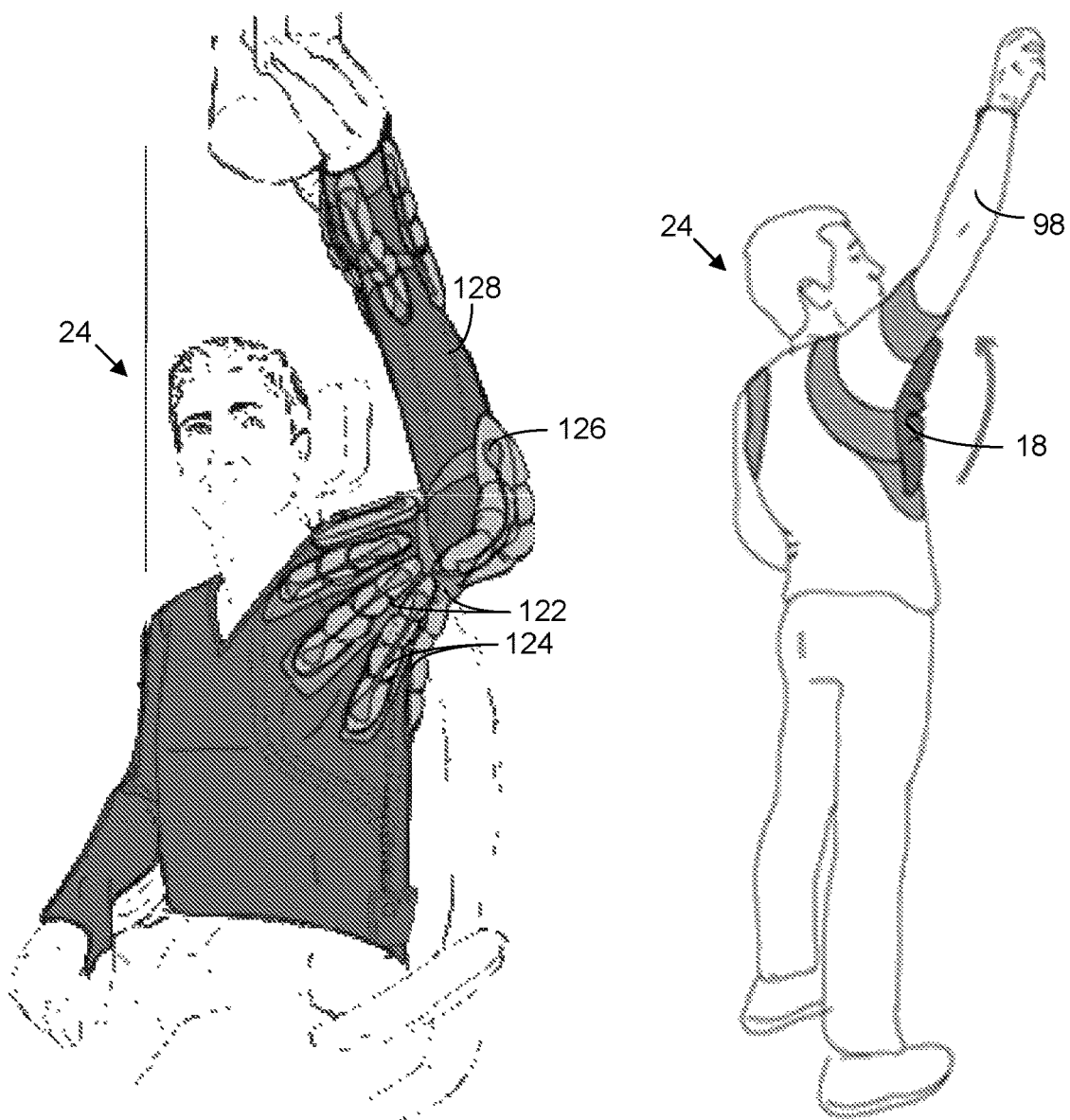
FIG. 73
FIG. 74
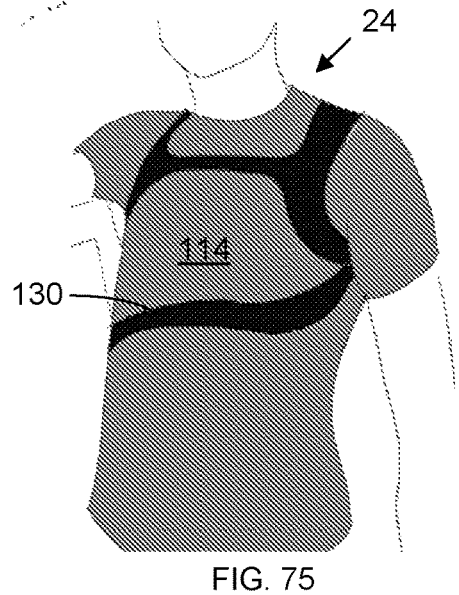
FIG. 75

TEXTILE ACTUATORS

GOVERNMENT SUPPORT

This invention was made with government support under Grant Nos. 1454472 and 1317744 awarded by the National Science Foundation. The U.S. Government has certain rights in the invention.

BACKGROUND

Soft fluidic actuators have seen significant interest in recent years as an alternative to traditional electro-magnetic actuation technologies. Compared to traditional actuators, such as electromagnetic or rigid hydraulic actuators, soft fluidic actuators offer potential advantages in terms of weight, compliance and fabrication cost. Additionally, soft fluidic actuators can be mechanically programmed to generate complex motions using only a single input, such as pressurized gas or liquid, as described in PCT Application Publication No. WO 2015/066143 A1, PCT Application Publication No. WO 2015/050852 A1, and PCT Application Publication No. WO 2015/102723 A2.

Perhaps the most widely applied example of a soft fluidic actuator is the McKibben actuator. McKibben actuators exhibit linear contraction in response to pressure changes. McKibben actuators essentially consist of a balloon or bladder that is placed inside a braided shell; these components and, therefore, the overall structure are extremely lightweight. The braided shell functions to constrain the expansion of the balloon and results in the characteristic motion of the actuator.

SUMMARY

A textile actuator serving as a soft wearable robot and methods for its fabrication and use are described herein, where various embodiments of the apparatus and methods may include some or all of the elements, features and steps described below.

A textile actuator worn by a user comprises a textile envelope that defines a chamber made fluid-impermeable by a fluid-impermeable bladder contained in the textile envelope and/or a fluid-impermeable structure incorporated into the textile envelope. The textile envelope has a pre-determined geometry and a non-linear equilibrium state at a displacement that provides a mechanical stop upon pressurization that prevents excessive displacement of the textile actuator to a degree that over-extends the joint. A fluid is delivered into or out of the chamber to displace the textile envelope primarily by transitioning from an uninflated state to the pre-determined geometry due to displacement of the textile envelope rather than via stretching or contraction of the textile envelope. When actuated, the textile actuator (a) displaces a body segment of the user and/or (b) supports and holds the body segment of the user in place.

A soft wearable robot for a wearer's shoulder includes a vest, an arm wrap, an abduction actuator mounted on one side to the vest and on another side to the arm wrap, and a pair of horizontal extension/flexion actuators. A front horizontal extension/flexion actuator is mounted on one side to the vest on a first side of the abduction actuator and on another side to the abduction actuator, while a rear horizontal extension/flexion actuator is mounted on one side to the vest on a second side of the abduction actuator and on another side to the abduction actuator in an antagonistic configuration with the front horizontal extension/flexion actuator. The abduction actuator and the front and rear horizontal extension/flexion actuators each comprise a substantially inextensible textile envelope that defines a chamber that is made fluid-impermeable by a fluid-impermeable bladder contained in the substantially inextensible textile envelope and/or a fluid-impermeable structure incorporated into the substantially inextensible textile envelope. The substantially inextensible textile envelope has a predetermined geometry and a non-linear equilibrium state at a displacement that provides a mechanical stop upon pressurization of the chamber to prevent excessive displacement of the substantially inextensible textile actuator.

An advantage of this textile-based approach is that the robot can be lightweight, low-profile, comfortable and non-restrictive to the wearer, and easy to don like an item of clothing. The actuator's ability to fold flat when not in use allows the robot to be almost invisible under clothing, potentially allowing the user to avoid any stigma associated with using assistive devices in public.

BRIEF DESCRIPTION OF THE DRAWINGS

FIGS. 33-35 show a horizontal extension/flexion actuator (HEFA) 20 that includes stiff inclusions in the form of semi-rigid plates 36 to prescribe paths of motion by creating a linkage.

FIG. 70 shows an actuator anchoring principle using inextensible woven fabric 112, stretchable fabric 114, crossed back straps 116, and a front sternum strap 118.

FIG. 71 shows an abduction actuator 18 that generates a vertical and torsional load reacted by nonstretch sections 112 of the garment surrounding the shoulder and a strap 118 across ribs.

FIG. 72 includes drawings of a user wearing an actuator system with an arm cuff 52 that is adjustable in diameter and that includes a non-slip material 120 inside, which assists in reacting axial and torsional forces.

FIG. 73 shows a distributed actuation including an array of actuators 124, a garment base 128, integrated anchoring 122, and distributed sensing 126.

FIG. 74 shows a soft wearable robot embodiment with actuators 18 for assisting overhead tasks.

FIG. 75 show a harness system of inextensible fabric on a garment otherwise formed of stretchable fabric. The harness system includes a horizontal strap 130 for reacting horizontal forces from the actuator.

Figure 1:
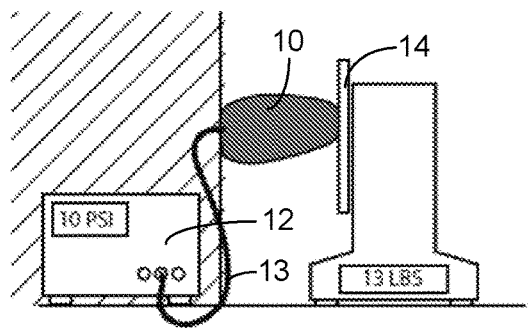
FIGS. 1-4 present side view comparisons of an extensible actuator 10 (FIGS. 1 and 2) with different load forces (provided by a compressor 12 coupled with the actor 10 via a conduit 13 for fluid delivery) against a force plate 14 and an inextensible actuator 10 (FIGS. 3 and 4) also with different load forces against a force plate 14, wherein the shape (cross-section) of the inextensible actuator (FIGS. 3 and 4) can be seen to deform (radially expand) less than the extensible actuator (FIGS. 1 and 2).

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," means within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Soft actuators for prescribing various types of motions, such as bending, twisting, and extending have relied largely on extensible materials (elastomers, extensible knit fabrics) constrained by inextensible materials (aramid fibers, paper, woven textile) molded into or wrapped around their elastomeric bodies to create their characteristic motions. Described herein are actuators that are configured to produce a displacement mostly via a change in geometry between its uninflated shape and the predetermined geometry of its equilibrium state (i.e., fully inflated state), due to displacement of the textile envelope rather than via stretching of the textile envelope during a relative increase in pressure inside the chamber.

Figure 2:
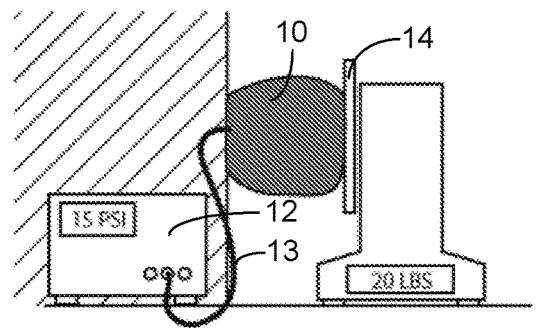
Figure 3:
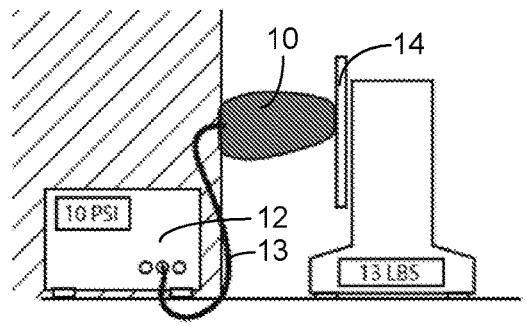
Figure 4:
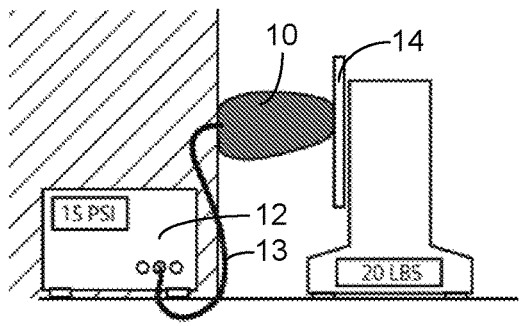

In particular embodiments, the actuators can include an envelope that consists solely or essentially of inextensible textiles (e.g., inextensible knits, woven, non-woven, etc.) that can prescribe the same motions listed above. Inextensible textile actuators (ITAs) can be designed with specific equilibrium states (end states or shapes where they are stable despite increasing pressure), pressure/stiffness ratios, and motion paths. ITAs are particularly well suited to accurately delivering high forces because inextensible materials allow greater control over directionality of the forces. For example, a pressure exerted by an ITA will continue to increase as internal pressure increases until failure, whereas a pressure exerted by an extensible actuator will hit a limit where the extensible material will prefer to expand/deform; the examples of FIGS. 1-4, which show a compressor 12, an actuator 10, conduits providing fluid communication between the compressor 12 and the actuator 10, and a force plate 14, show the same amount of force output between the two types of actuators but with the extensible actuator 10 (FIGS. 1 and 2) expanding at a certain threshold, thus greatly expanding its contact area and diameter. In alternative embodiments, the textile(s) that form the envelope may have some stretchability, though, like the ITA's, they have a pre-determined geometry that results in a change in geometry between the uninflated shape and the predetermined geometry of its equilibrium state (i.e., fully inflated state), mostly due to displacement of the textile envelope rather than via stretching of the textile envelope during a relative increase in pressure inside the chamber.

Herein, we also describe methods for creating soft, fluid-powered, wearable robots that incorporate actuators with the predetermined geometry to assist with wearer movements. These wearable robots are constructed from textiles that interface between the user 24 and the actuators 18 and 20, transferring force comfortably and efficiently (see FIGS. 47 and 48). These devices can enable controlled assistance to be delivered to different body segments at the appropriate amplitude and timing. Textile/fabric construction and pneumatic actuation are advantageous for wearable robotics applications, as both are compliant and lightweight and, therefore, comfortable and become "transparent" to the operator when not in use (i.e., provide minimal restrictions when unpowered). This compliance also allows for generous alignment tolerances between actuators and joints, making the device easier to don and doff. Further, textile technologies utilize commercially available materials and tools for construction and are, therefore, readily manufacturable. These devices can be designed modularly so as to afford the most effective configurations for any task, and we present methods for customizing the components and their performance for different body segments and tasks. These devices can be used to assist individuals suffering from a range of neuromuscular conditions or muscle weakness either as an assistive or rehabilitative device, as well as to assist healthy individuals performing activities where their muscles may be overburdened or become fatigued. A number of embodiments are presented for the upper and lower extremities.

Inclusion of Sensors:

As robotic devices, actuated soft wearables can utilize feedback in order to achieve control and to be as helpful as possible; this robotic feedback can be provided by sensors. In monitoring actuated soft devices, it is helpful to incorporate one or more sensors 22 (see FIGS. 5 and 6) that are compatible with these actuators 18 and 20 (e.g., soft sensors made from elastomers or fabrics or miniature sensors, such as pressure sensors, inertial measurement units, etc.) into the wearable or to attach the sensor(s) to the user's body so as to not restrict the actuator and garment from conforming to the human body. There are two main modalities by which sensing of soft wearable robots is helpful, sensing of the actuator 18/20 (see FIG. 6) and sensing of the wearer 24 (see FIG. 5).

Sensing the Actuator

Sensing of the actuator 10/18/20 allows for feedback on the state of the actuator, be it pressure, contact forces, applied torque/force, displacement, curvature, deformation, movement, etc. This knowledge of the state of the actuator is useful for the control of the actuator. These sensors 22 can inform a controller (e.g., a computer in electronic communication with the sensors 22) about whether the actuator 10/18/20 is operating normally or if it is deflecting, overloaded or damaged. The sensors 22 can also let the controller know where the actuator 10/18/20 is between its compressed/deformed shape and its inflated shape.

Sensing the Wearer

Figure 5:
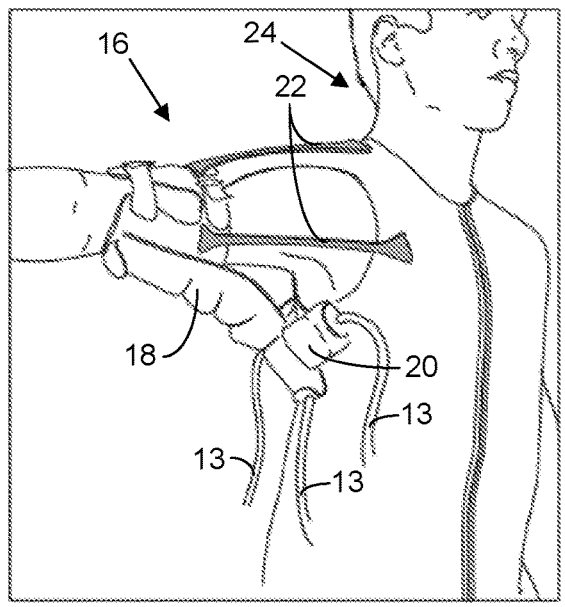
FIGS. 5 and 6 show a soft wearable robot 16 with soft textile actuators (abduction actuator 18 and horizontal extension/flexion actuators 20) and soft sensors 22 to sense the wearer 24 (FIG. 5) and to sense the actuators 18 and 20 (FIG. 6).

The second sensing modality is sensing of the wearer/user 24 (see FIG. 5). A benefit of making the sensors 22 with soft materials (e.g., textiles or elastomers) is that the soft sensors 22 are inherently compliant in nature and can, therefore, be ideally suited for integration into garments or the interfaces between soft actuators 18 and 20 and the body. Such sensors 22 may measure joint angles, respiration, contact forces, and other physiological phenomena. These measures of physiological information may be used for activity tracking or control of wearable systems. Joint angles can be compared to actuator data so the controller can determine whether the desired outcome has been achieved and what to do next.

Figure 6:
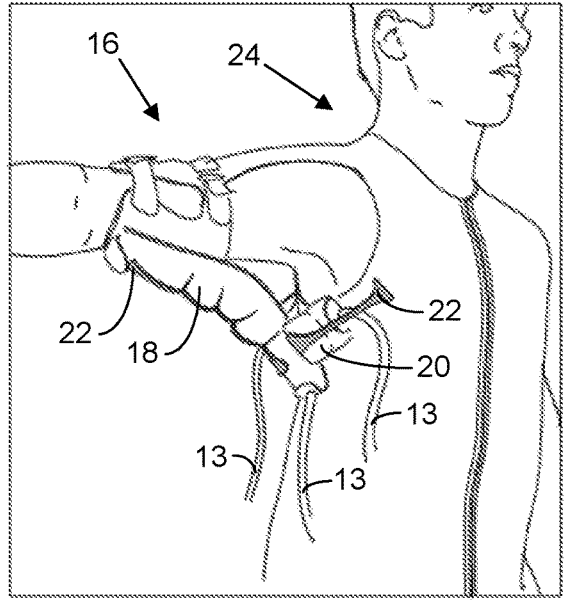

An example of the usefulness of both modalities of fabric-based sensors 22 can be found, e.g., in a shoulder-assistive device, as shown in FIGS. 5 and 6. If the user 24 wants to horizontally flex his or her arm (i.e., rotate the arm forward on the transverse plane) 90 degrees, the device activates the horizontal extension/flexion actuator (HEFA) 20 described herein. A soft contact sensor 22 can be applied below the HEFA 20, while a stretch sensor can be applied to the assistive device such that it measures the actual angle of the joint. In this scenario, the controller engages the HEFA 20 until the stretch sensor 22 indicates that the arm is at 90 degrees, wherein that reading is processed to generate a communication that is then sent to the actuator 20 to terminate further inflation. If pressure on the contact sensor 22 becomes too great during actuation, the controller can terminate inflation to prevent injury to the user 24 or the device.

Sensing in and of the actuators 18 and 20 is not limited strictly to soft sensors 22. A range of commonly used "hard" sensor types, such as inertial measurement units (IMU's), gyroscopes, and string potentiometers can be used to track the position of the limb and/or trunk of the wearer 24. These hard sensors typically consist of rigid components, often contained within an enclosure. External methods, such as visual tracking by a computer or electromagnetic tracking, may also be used to control devices. Inflation pressures (provided, e.g., via a pump or pressurized vessel in fluid communication with the chamber) may be measured by more-traditional pressure transducers, and contact forces may also be captured in a similar manner. Fusions of these commonly used "hard" sensors and soft sensors may be developed to achieve optimal control of a system—for example, IMU's can be used to track the motion of the limb relative to the body, while soft sensors measure the interaction forces and internal pressure of the actuator.

Application Areas and Needs for Soft Wearable Robots

Overall Descriptions

Soft wearable robots can be applied to a joint (e.g., ankle, shoulder, knee, etc.) to increase the force output of that joint. This increase in force output can have an effect on human capabilities, such as a stronger limb, added stability, increased range of motion, or decreased metabolic cost of a motion. These types of robots can be employed anytime the human body needs assistance with muscle-generated force or motion.

Two advantages of soft wearable robots over their rigid counterparts include the following: first, their softness and flexibility makes them well suited to working with and on a soft human body; second, their under-actuated nature allows for complex movements from simple mechanisms. Particularly interesting application areas include applications for healthy individuals, such as industrial manufacturing and operations, construction, rescue, military, as well as applications for impaired individuals, such as rehabilitation and/or assistance for neurological dysfunction, rehabilitation and/or assistance for orthopedic dysfunction, assistance for the elderly, and recreational sport.

Augmenting Healthy People

Figure 7:
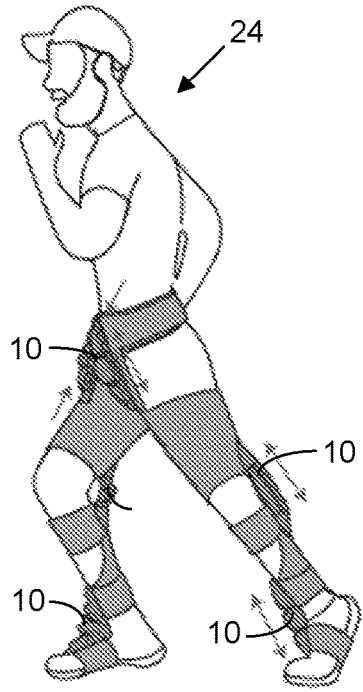
FIGS. 7-9 show soft textile actuators 10 worn by a user 24 to provide gait assistance (FIG. 7), tool support (FIG. 8), and crouch support (FIG. 9).
Figure 8:
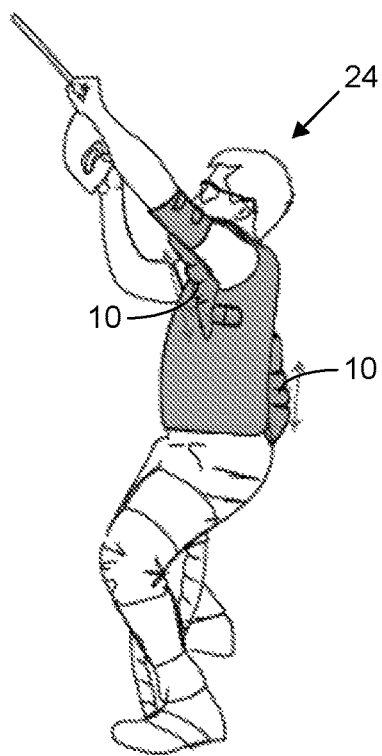
Figure 9:
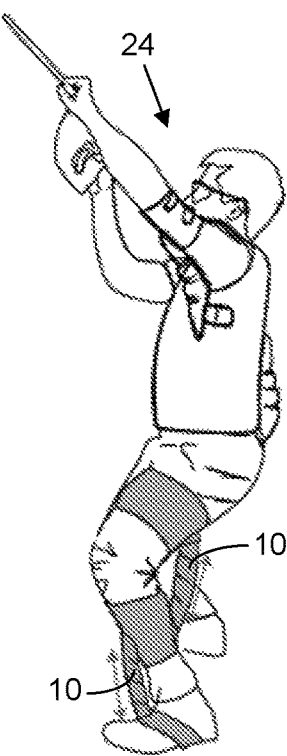

Some examples of soft-robotic assistance for healthy individuals are provided, below, and shown in FIGS. 7-9, which show gait assistance (FIG. 7), tool support (FIG. 8), and crouch support (FIG. 9).

First, a soft wearable robot, as described herein, can assist soldiers carrying heavy loads. In this scenario, the robot applies small amounts of force to the leg joints at points during the gait cycle (see FIG. 7), thus reducing the amount of energy (or the metabolic cost) needed for walking. The suit is lightweight and compliant for comfort and does not interfere with normal gait mechanics.

Second, the soft wearable robot can serve as an upper-limb assistive device for manufacturing and construction, where heavy tools need to be supported and operated (e.g., when holding a tool overhead) for extended periods of time (see FIG. 8). Companies such as EksoBionics, Lockheed Martin and Robomate are developing rigid suits to assist workers in these scenarios; however, soft wearable robotics offer some distinct advantages. Since a value proposition here is to minimize the fatigue experienced during long bouts of machine work, comfort is highly advantageous. Also, many construction and manufacturing jobs involve tight or awkward spaces (such as a drydock for ship building), where a rigid robot might be cumbersome; the soft robot, however, can fit under the arm and in the elbow crease of a user, leaving the user unhindered and able to operate at any angle. Also, while the format of the aforementioned rigid robots can make working overhead very difficult, the soft robot can offer support at any arm angle.

Third, the soft robotic wearable can be used to stabilize a user's legs in industrial settings (see FIG. 9). Companies such as Noonee and Archelis produce complex rigid wearables to support crouched positions in the work place, rigid wearables of this nature can be replaced by soft robots that are, e.g., low profile, lightweight and transparent (non-restrictive with respect to motion) when not engaged.

Assisting Patients with Impairments

Acute clinical need is seen in assistance with activities of everyday living (ADLs). Several neuromuscular conditions, such as stroke, spinal cord injury (SCI), muscular dystrophy (MD), amyotrophic lateral sclerosis (ALS, also known as Lou Gehrig's disease), etc., result in a limited ability to perform ADLs, which ultimately leads to a loss of independence. A limited ability to perform ADLs is associated with both an increased risk of mortality and up to a 10-year reduction in life expectancy. To this extent, a suffering person's ability to move his/her upper limb and to interact with the environment is often seen as critical in sustaining that person's ability to perform ADLs.

Figure 10:
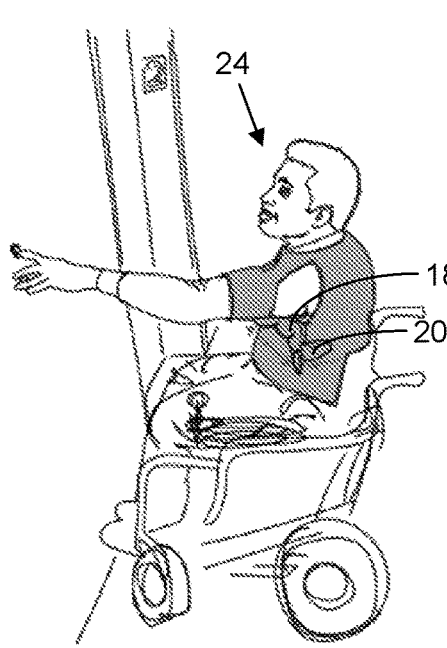
FIGS. 10-12 show additional embodiments of soft textile actuators worn by a user to provide upper limb assistance (FIG. 10), gait assistance (FIG. 11), and knee stabilization (FIG. 12).
Figure 11:
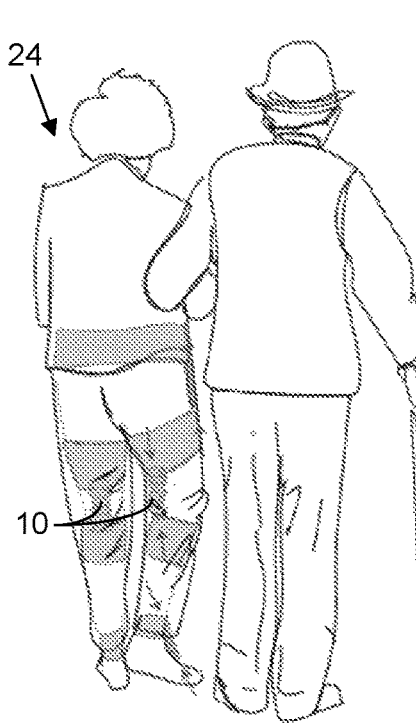
Figure 12:
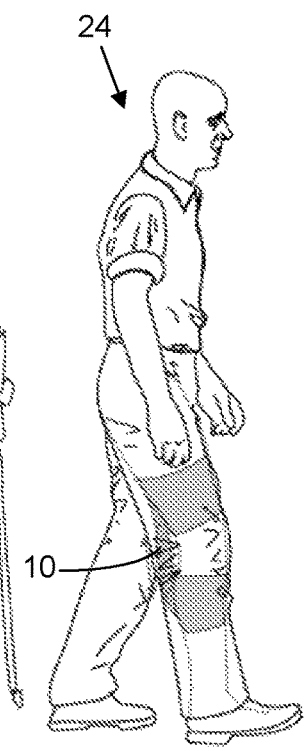

The soft wearable robots can assist those suffering from these conditions in a number of ways; a few examples are provided below and shown in FIGS. 10-12. First, a device that assists lifting of the arm (see FIG. 10) can help those with ALS, MD, etc., to make reaching motions and, therefore, maintain one's abilities to wash one's hands, retrieve items from cupboards, eat, etc. A soft wearable robot can be used on the lower extremities for elderly patients (see FIG. 11) to assist the strength of leg joints providing stability and stamina in order to encourage mobility and interaction with their community. A similar robot for osteoarthritis (OA) patients can be placed on the knee to stabilize it during the gait cycle (see FIG. 12), thus minimizing the need for painful muscle contractions that are otherwise needed to provide stability, thus decreasing the pain experienced by the user when walking.

Actuator Designs

Broadly speaking, ITAs and other soft wearable robots, as described herein, have the same function as many other soft fluidic actuators, such as pneunets, fiber-reinforced actuators, soft fabric actuators, etc., in particular, the capacity to bend, extend, twist, and contract via fluid actuation. Soft fluidic actuators can create complex motions with a few inexpensive parts and can safely be placed on the body. These functions can be achieved by appropriating the specific properties inherent to the different types of materials, such as rubber reinforced by paper or string, textile assemblies with anisotropic stretch properties or, in the case of robots/actuators described herein, textile assemblies with specific geometries. A clear distinction between these actuators and other soft fluidic actuators is that these actuators have a pre-determined geometry that produces displacement mostly via a change in the geometry between the uninflated shape and the pre-determined geometry of its equilibrium state (i.e., fully inflated shape) due to displacement of the textile envelope rather than via stretching of the textile envelope during a relative increase in pressure inside the chamber; in particular embodiments, this effect can be achieved by using inextensible materials in the construction of the envelope. All of the above-referenced patent publications cited in the Background rely on the use of extensible materials constrained by inextensible materials.

ITAs include a substantially inextensible outer shell (envelope) that defines its shape (references to "inextensible" or "substantially inextensible" herein may allow for expansion by no more than 10%, no more than 5%, or no more than 1% in any direction), an inner airtight volume for pressurizing the actuator, and an inlet for fluid. ITAs and other actuators described herein use textiles to create pre-determined geometries through cut-sew patterning, forming, laminating, etc., to define a chamber. The geometries can include different geometric features in different areas in order to generate certain motion/force/stiffness profiles and final equilibrium states. These geometries control a number of the actuator's attributes including the type of motion (e.g., bending, extending, twisting, etc.), the range of motion (e.g., 3", 180 degrees, etc.) and the pressure-to-stiffness relationship (e.g., linear, non-linear, exponential, etc.). The geometry of the envelope can be configured to dictate substantially all displacement upon fluid actuation and can be continuous without any gaps, except for an input/output for fluid. The actuators can also incorporate stiff inclusions to modify or constrain their motions as necessary for a given task.

The actuators can be made in a number of ways, as mentioned above. All of these methods can utilize various types of textiles. Readily available are tight woven fabrics, such as ripstops, taffetas and oxfords. These woven fabrics tend to have little/no stretch in the warp or weft and are made with materials that have little stretch themselves. Woven fabrics do, however, have some amount of stretch in the bias (i.e., at a 45-degree angle between the warp and weft). Non-woven or laminated textiles do not have a warp/weft/bias and, therefore, tend to be even more stable than wovens and, therefore, well suited to making ITAs; non-wovens, however, tend to be less robust than woven fabrics. Another option is knitted fabrics with little to no stretch, such as warp knits. In all of these materials, synthetic fibers are advantageous. Synthetics, such as nylon and polyester, tend to be finer and more stable than organic fibers with shorter staples, such as cotton, linen and wool; they tend also to be less expensive.

These materials can be assembled in a number of ways. The intent in assembly of the textile envelope is to create the desired geometry accurately in order to ensure the desired attributes of an actuator. Cut-and-sew patterning is the same method used to define the sizes and shapes of most clothing. The desired geometry is broken down into "pattern pieces" that can be cut out from a flat piece of material and then assembled by means of sewing. Similar methods can be used with fabric welding techniques instead of sewing. Some of these methods include impulse sealing, heated dies/molds and/or heat presses, radiofrequency (RF) and ultrasonic welding machines, bonding, and gluing.

Figure 47:
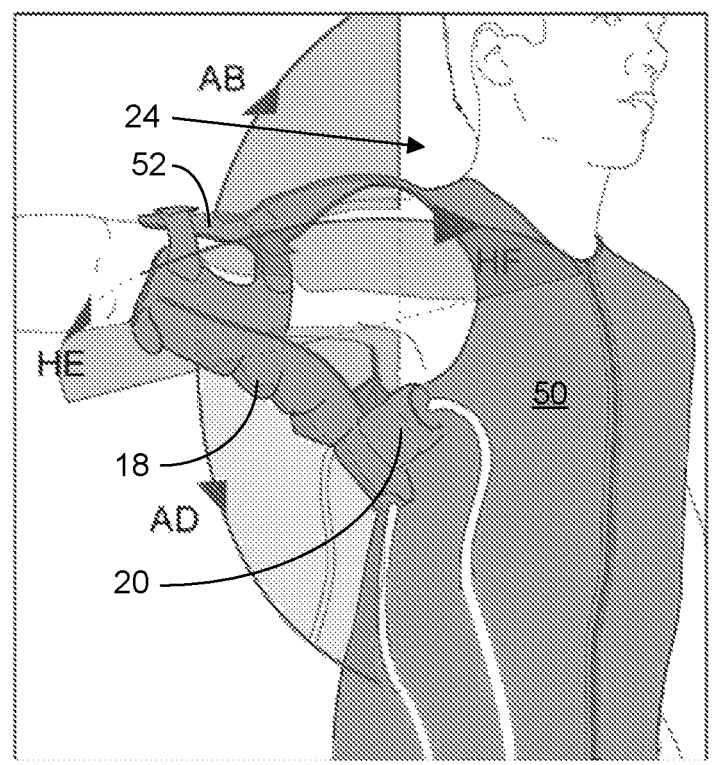
FIG. 47 shows a soft, fluid-powered wearable robot (serving as shoulder actuator), incorporating soft textile actuators 18 and 20 attached to a vest 50 and an arm wrap 52 to assist wearer movements, including the following anatomical motions: abduction (AB), adduction (AD), horizontal flexion (HF) and horizontal extension (HE).
Figure 48:
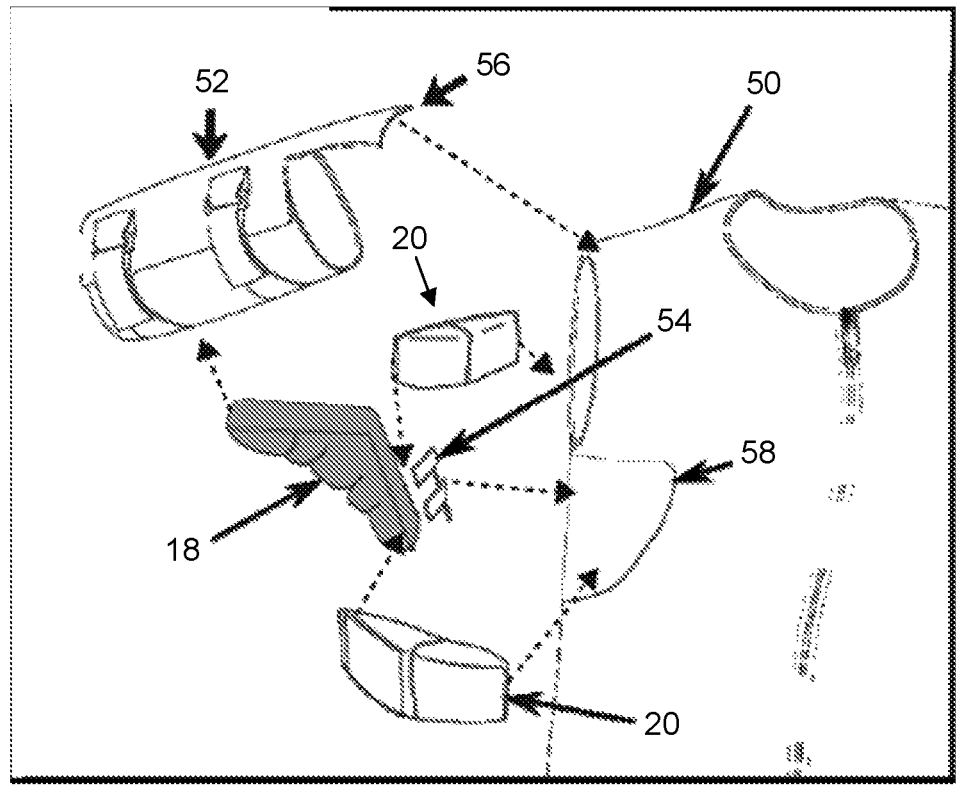
FIG. 48 is an exploded view of a final robot, including a soft cruciate linkage (SCL) 54, the arm wrap 52 with a strap 56 for connecting to the vest 50, abduction and horizontal extension/flexion actuators 18 and 20, and a flexible plate 58 mounted on the vest 50 to which the soft cruciate linkage and the horizontal extension/flexion actuators 20 are mounted.

For patterning complex geometries for the textile envelope, it is helpful to begin by creating a model of the desired equilibrium state. Fabric or paper can then be draped over this form and marked to create pattern pieces. Shapes can be defined by individual shaped pieces or single fabric pieces that are darted or gathered to provide the actuator with a pre-determined geometry that is manifested when the fabric is unfolded or otherwise extended during inflation; accordingly, displacements such as bending and folding can be achieved via differences in path length on different sides of the envelope. Pattern pieces with cut-and-sew or cut-and-weld methods also include seam allowance—i.e., extra fabric around the perimeters of the pattern piece to allow for attachment to adjacent pieces. Cut-and-sew methods have been used to produce the complex geometries of the abduction actuators (ABAs) 18 and horizontal extension/flexion actuators (HEFAs) 20, as seen in FIGS. 47 and 48.

Figure 41:
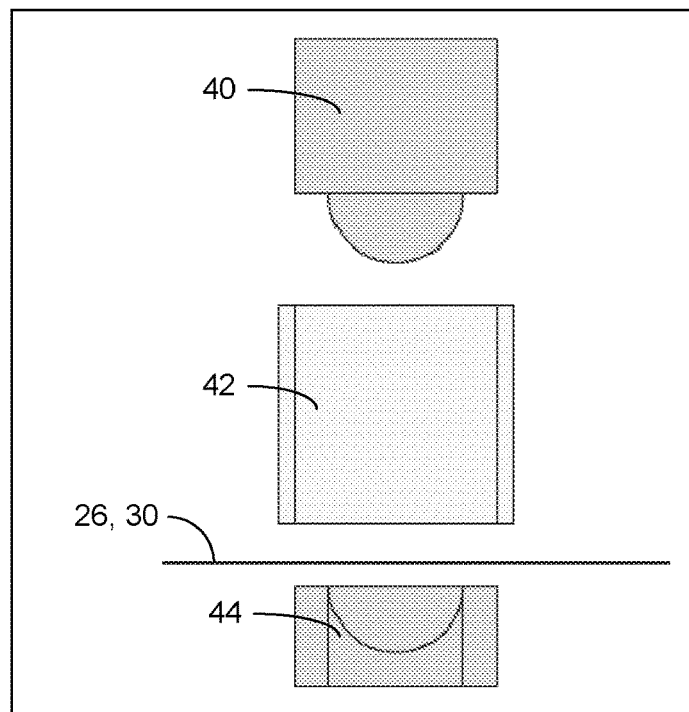
FIGS. 41 and 42 show fabrication of a textile actuator using a tool/mold 40, clamp/tool-guide 42, and die 44.
Figure 42:
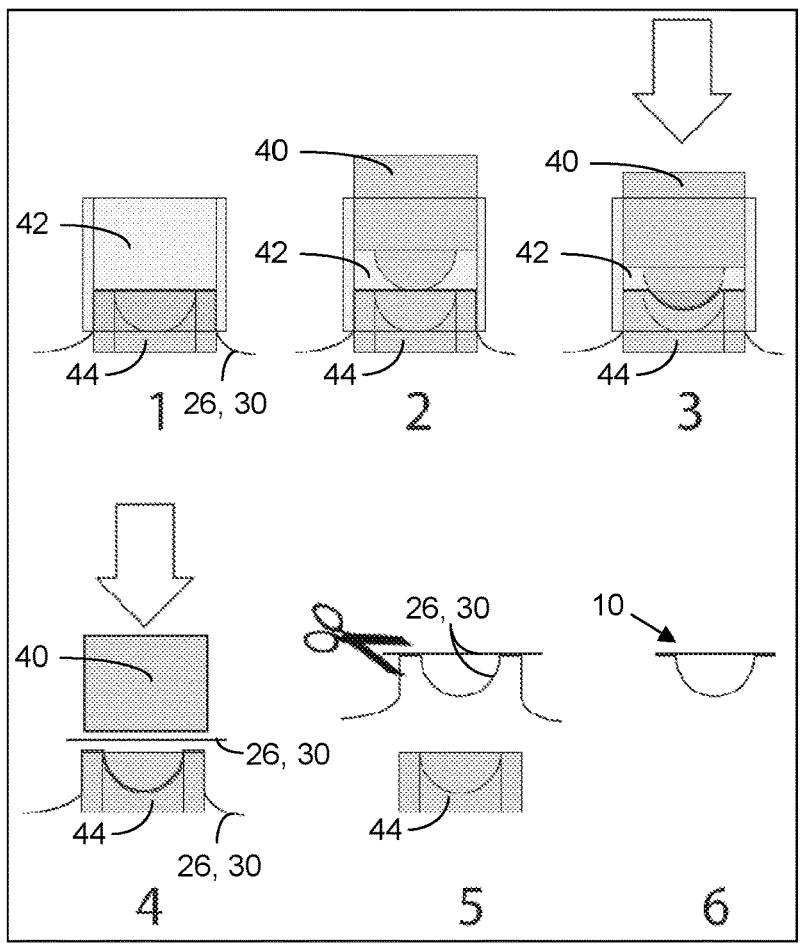
Figure 43:
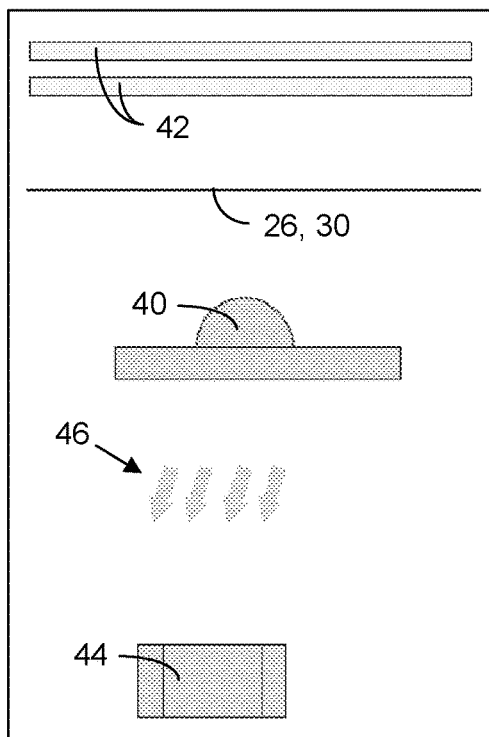
FIGS. 43 and 44 show fabrication of a textile actuator 10 via a vacuum-forming process, where a vacuum 46 is applied to the mold 40 and die 42.
Figure 44:
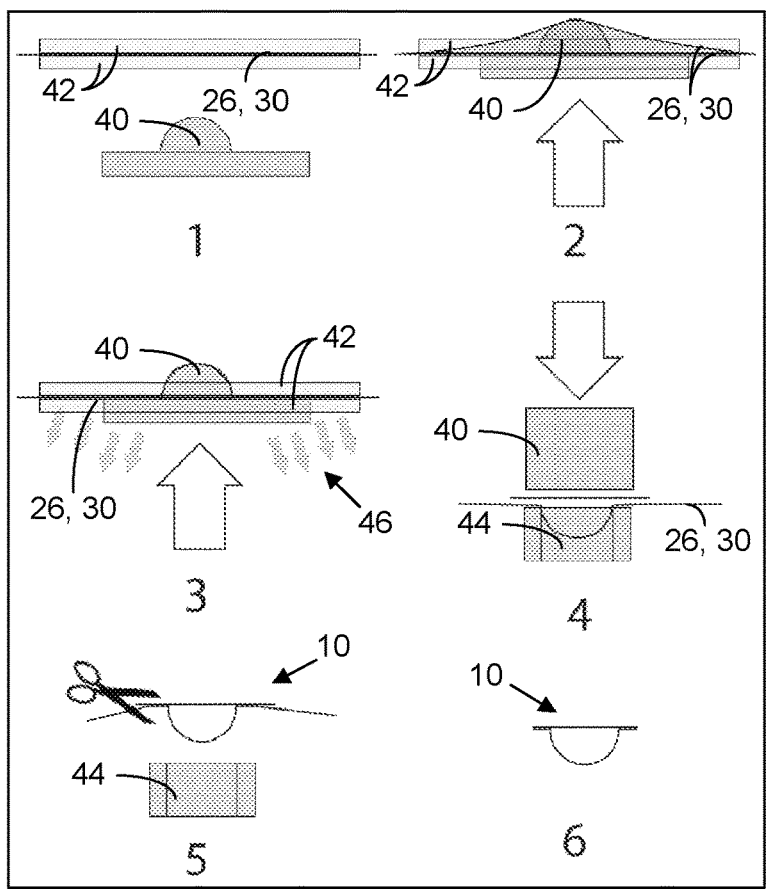
Figure 45:
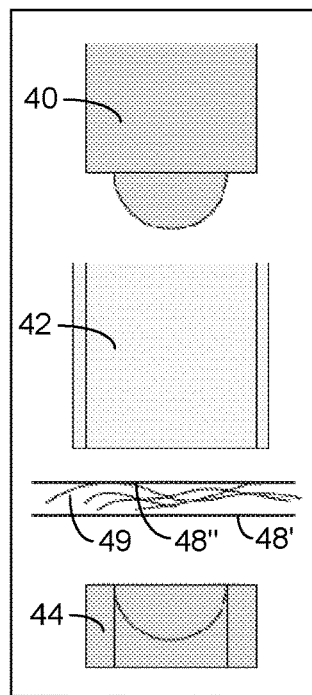
FIGS. 45 and 46 show fabrication of a textile actuator 10 via lamination of laminate materials 48 and 49 for a composite structure 28.
Figure 46:
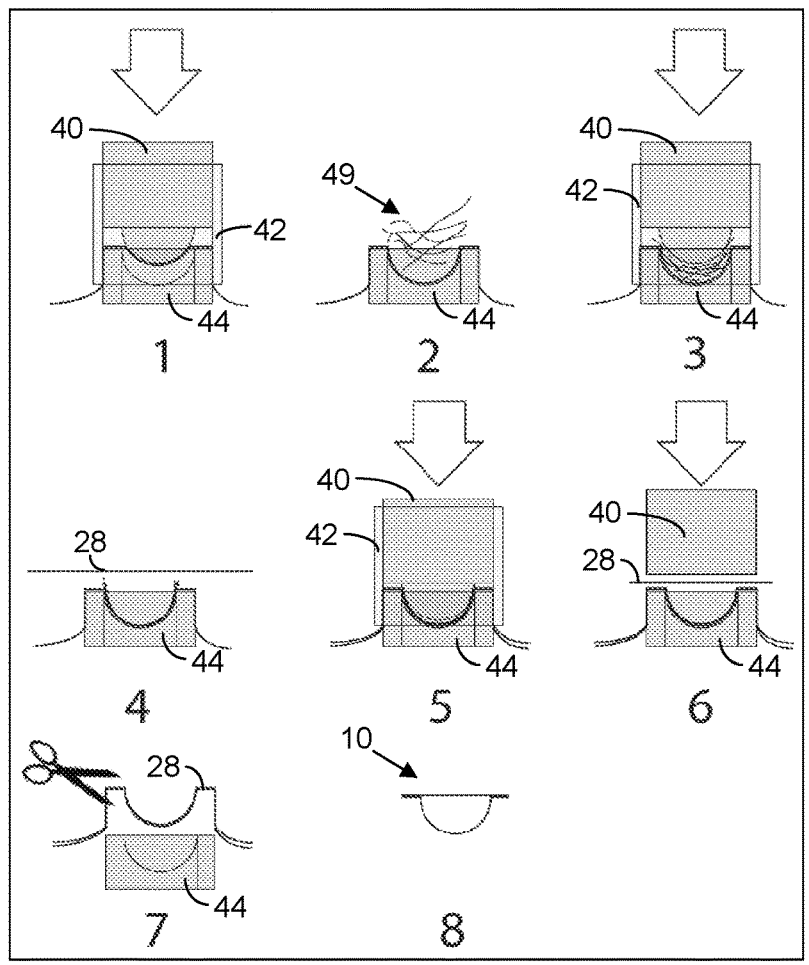

Other techniques, such as forming, laminating, and 3-dimensional weaving/knitting can be used to create envelope geometries without the use of seams. Forming can be achieved with thermoplastic synthetic materials (again nylon, polyester, etc.) as well as some organic materials, such as wool. Forming the envelope can be achieved with the use of tooling, such as molds 40 and dies 44, where the fabric is pressed onto or into a mold, form or die to take on the shape of the tool, as shown in FIGS. 41 and 42. Heat, time and/or pressure (e.g., an applied vacuum 46, as shown in FIGS. 43 and 46) can be increased, as necessary, to achieve larger/deeper shapes; synthetics can be plastically deformed in this process. Forming, as shown in FIGS. 43 and 44, creates the desired geometry but, in most cases, also leaves one side of the geometry open, where the tool 40 enters. On the open side, the forming can also be designed to create a flange or seam allowance for the attachment of another piece of material to close the geometry. Laminating, as shown in FIGS. 45 and 46 can be performed in a similar method using tooling, such as molds 40 and dies 44, where several layers of materials 48 and 49 are formed over the tool and then pressed together to create a uniform piece of material with the desired geometry; again, heat/time/pressure can be adjusted for ideal outcomes.

Figure 13:
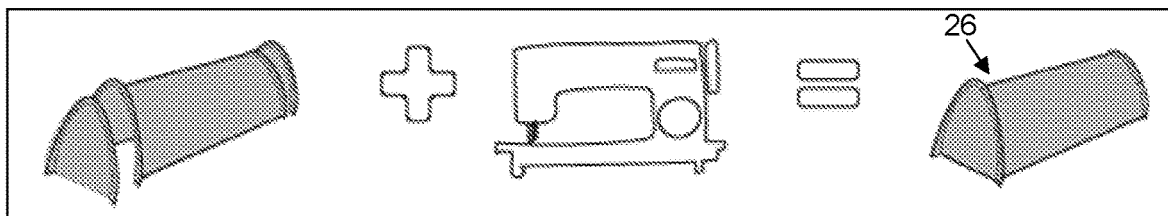
FIGS. 13-15 show steps in a fabrication process for fabricating a soft textile actuator, including cutting and sewing textile pattern pieces to form a textile envelope 26 (FIG. 13), forming a composite structure 28 by bonding a fluid-impermeable layer for the bladder with the textile envelope (FIG. 14), and laminating the layers to form a soft textile actuator 10 (FIG. 15).
Figure 14:
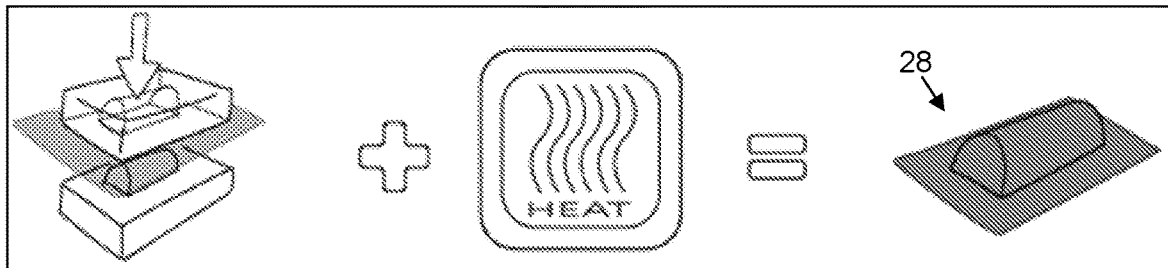
Figure 15:
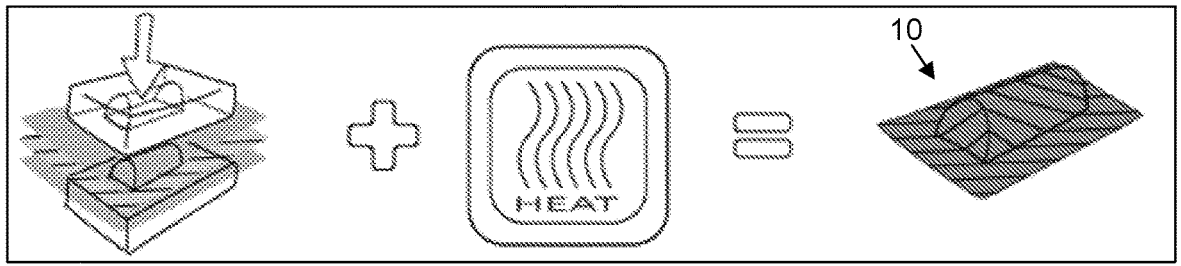

Laminating can also be performed with tooling, such as molds and dies, and the assistance of heat/time/pressure. In this process, layers are formed over the tool and then pressed into one uniform piece of material. The forming and pressing can be done separately or simultaneously (see FIGS. 13-15).

As described above, the actuators can include both an outer shell (envelope) to create the geometry and an internal bladder to remain airtight. The specific geometries for the textile actuator envelopes 26 can be created in a number of ways, including but not limited to cut-and-sew patterning (see FIG. 13), forming or molding (see FIG. 14), laminating (see FIG. 15), felting, three-dimensional (3-D) knitting or weaving, electrospinning, etc. All of these methods can be used with a bladder or created in such a way that they do not require a bladder to hold air or another gas or liquid.

Figure 16:
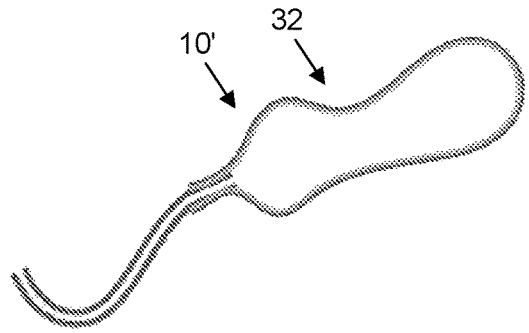
FIGS. 16-19 show an embodiment of a bladderless actuator 10' with a fluid feed line (FIGS. 16 and 17) and an actuator with a discrete bladder 30 and textile envelope 26 (FIGS. 18 and 19) in uninflated 32 and inflated 34 states.
Figure 17:
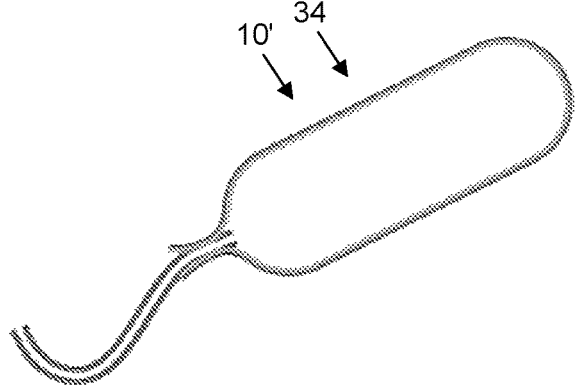
Figure 18:
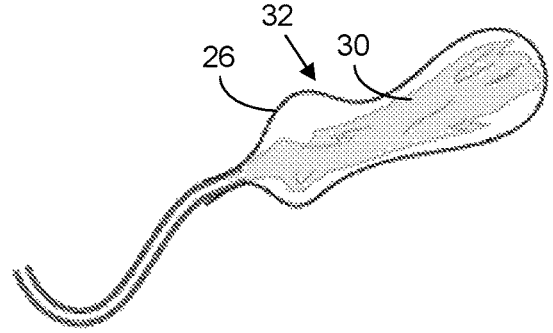
Figure 19:
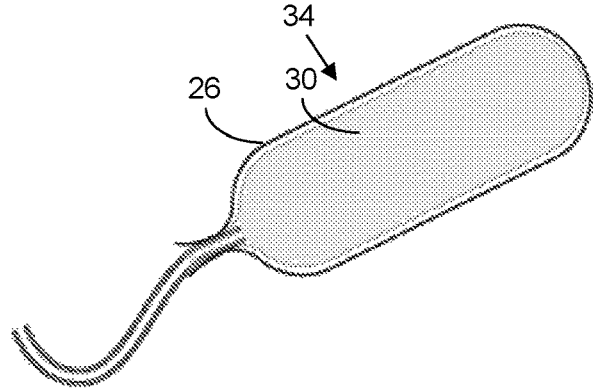

In cases where the envelope 26 is airtight, in and of itself, the envelope 26 does not need a separate bladder—these are called bladderless actuators 10' (see FIGS. 16 and 17), which can be contrasted with actuators 10 that include separate bladders 30 (see FIGS. 18 and 19). Bladderless actuators 10' can be created by forming or laminating airtight materials or by sealing other materials during or after construction. Some methods of sealing include sealing (e.g., via bonding or welding) or applying tape or adhesive over sewn seams, spraying actuators with air-impermeable coatings, heat setting porous materials to close pores, or dipping actuators in or spraying actuators with air-impermeable coatings. Additional embodiments including forming materials to create geometry or a combination of sealing and forming.

Bladderless actuators can be formed or shaped in a number of ways, e.g., involving heat, a thermoplastic material (e.g., fiber, textile, or film) and tooling, such as a mold, form, or die. Heat is applied to the material so that the material can deform to the shape of the tooling. Force can also be applied atmospherically, with a vacuum or air pressure or directly with the use of a tool to encourage the material onto/into the mold. Further, this process can be performed with multiple layers, where several layers are molded together at the same time or are applied to the mold in stages.

Examples of Molding Processes:

In a first example, shown in FIGS. 41 and 42, the actuator is formed using a tool 40 and die 44. First, one or more pieces of material (e.g., the material for the bladder 30 and envelope 26) is clamped over the opening of a die 44. A tool 40 is placed on top of the die 44 such that the material is between the tool 40 and the die 44. The material is heated and, while the material is hot, force is applied to the tool 40 pushing it and the heated material into the die 44. The side of the material facing out of the die 44 is coated with adhesive (e.g., pre-coated, coated after molding, or both); another piece of material (e.g., the material for the bladder 30 and envelope 26), whether formed, flat or otherwise, is placed on top of the adhesive, and heat and/or pressure is applied to bond the layers along the adhesive. The now-sealed actuator 10 is removed from the die 44, and excess fabric/material is trimmed to produce the now-complete actuator 10.

In a second example, shown in FIGS. 43 and 44, the actuator 10 is vacuum-formed. First, material (e.g., the material for the bladder 30 and envelope 26) is clamped into the frame of a vacuum-forming machine, and is heated. A mold 40 is then pressed into the heated and now soft material and a vacuum 46 is pulled to form the material 26 and 30 around the mold 40; this vacuum forming may be assisted with a die 44. The material is then removed from the mold 40 and rests in the die 44 with an adhesive (whether pre-coated on material or added after molding or both) side facing out of the die 44. A second piece of material (e.g., the material for the bladder 30 and envelope 26), whether formed, flat or otherwise, is placed on top of the adhesive, and heat and/or pressure is applied to bond the layers along the adhesive. The now-sealed actuator 10 is removed from the die 44, and excess fabric/material is trimmed to produce the now-complete actuator 10.

In a third example, the actuator 10 is formed via lamination, as shown in FIGS. 45 and 46. First, an outer layer 48' (e.g., a synthetic film) is formed over or into a mold 40 (e.g., using the above-described processes). An intermediate layer 49 (e.g., fiber) is then added and heated and/or formed onto the outer layer 48'. An inner layer 48" (e.g., another synthetic film) is then added and heated and/or formed onto the intermediate 49 and outer layers 48'. This laminated composite layer is then placed into a die 44 with an adhesive (whether pre-coated on material or added after molding or both) side facing out of the die 40. Another piece of material (whether formed, flat or otherwise) is placed onto the adhesive, and heat and/or pressure is applied to bond the layers along the adhesive. The now-sealed actuator 10 is removed from the die 44, and excess fabric is trimmed to produce the now-complete actuator 10.

a. Creating Motion

The actuators create motion through their geometries, which change via fluid actuation. These motions can be bending/folding, twisting, extending or contracting or any combination of these motions based on the chosen geometries in the actuator. Motions result from a difference between an un-inflated shape and a specific, "pre-determined" (also referred to as "pre-programmed") equilibrium state/shape. In order to create motion, the pre-inflated shape is not in its equilibrium state, either because it is being deformed by a load or because it was designed in such a way that the actuator's non-inflated shape is intentionally different than its equilibrium shape. When a pressurized fluid is introduced into the actuator it begins to expand toward its equilibrium shape, thus creating a motion and potential force. The modes of generating motion listed below are similar to those utilized in the patent publications mentioned previously in the Background; however, the means of leveraging these concepts is fundamentally different in that the actuators have a pre-determined geometry (e.g., in the form of pleats, folds or gathers, or cut-sew patterning) that produces displacement mostly via a change in geometry between the uninflated shape and the predetermined geometry of its equilibrium state due to displacement of the textile envelope rather than via stretching of the textile envelope during a relative increase in pressure inside the chamber. In particular embodiments, the actuators are ITAs that use solely non-elastic materials ("non-elastic", as used herein can include minimal elasticity—e.g., less than 10%, less than 5%, or less than 1% stretch in any direction under operating pressures). The advantages of this inelasticity is a more accurate and consistent application of force (as is briefly described, above, and as illustrated FIGS. 3 and 4) and more ability to control outputs, as described in sections b, c, and d, below.

Bending Actuators

Figure 22:
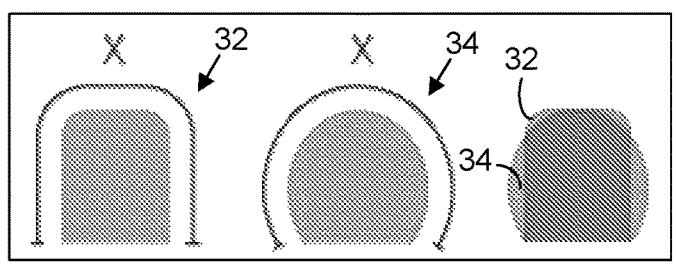
FIGS. 22-24 shows sectional views of the soft textile actuator in the uninflated 32 and inflated 34 states.
Figure 23:
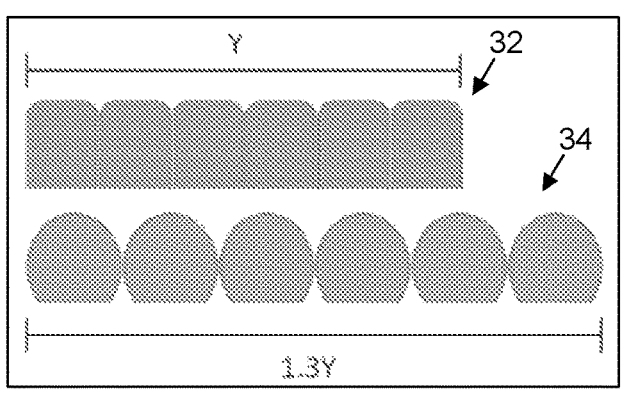
Figure 24:
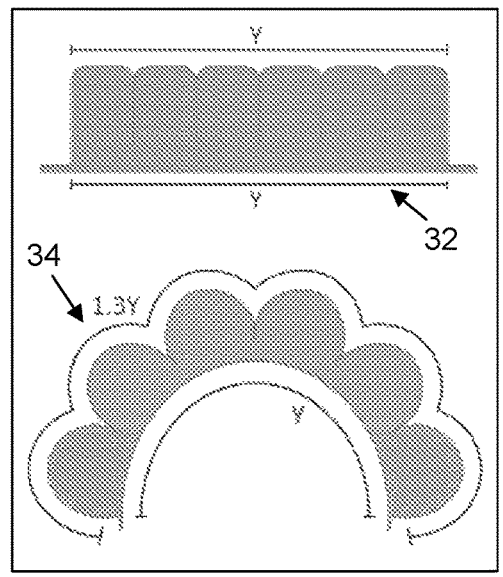

A bending actuator is a good example of the motion created between a pre-inflated state and an equilibrium state. Bending actuators 10 can be created by specifying longer "path lengths" (i.e., more textile) on one side of the envelope compared to another [see FIG. 20 (uninflated 32) and FIG. 21 (inflated 34)]. This path-length differential can be created by segmenting the envelope (FIGS. 22-24, which show the segments in uninflated and inflated states) or by patterning or forming the envelope to the exact shape of its equilibrium state; other methods of creating a bending actuator 10 include but are not limited to using an envelope with pleating and gathering of the textile.

Figures 20, 21:
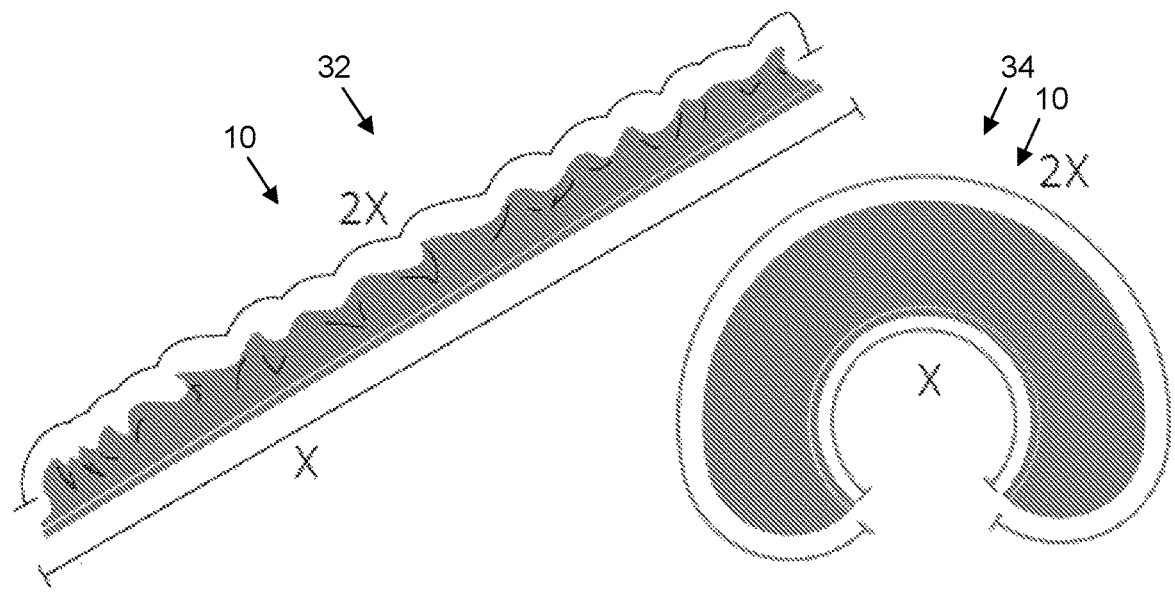
FIGS. 20 and 21 show a soft textile actuator 10 in an uninflated 32 state (FIG. 20) and inflated 34 (FIG. 21) to bend and establish a predetermined actuated equilibrium geometry.
Figure 25:
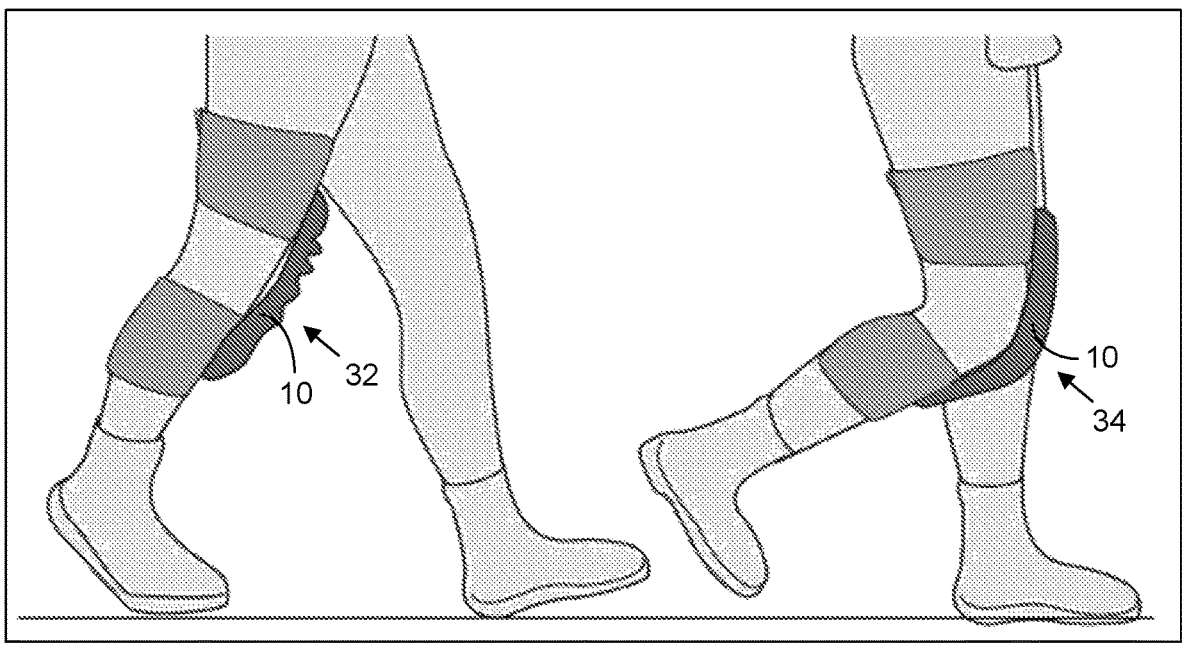
FIG. 25 shows a side view of a knee-assist soft textile actuator 10.

In the pre-inflated state 32, the actuator 10 may be gathered/wrinkled, as seen in FIG. 20. When the actuator 10 is inflated, all parts of the actuator 10 will expand, extend, etc., becoming taught and removing wrinkles. The portions of the actuator 10 with shorter path lengths will become taught more quickly and the actuator 10 will begin to bend, fold, etc., as the longer path lengths continue to expand. If this long/short differential is designed to be on opposite sides of the actuator 10 (e.g., top and bottom), it will generate a bending motion. The equilibrium state 34 is when both the long and short path lengths are under equal pressure/tension—in this case, with the actuator 10 "bent" (see FIG. 25, where the actuator 10 is shown uninflated 32 and inflated 34). The amount of bending can vary along the actuator 10 depending on the ratio of path lengths of the envelope on opposite sides of an actuator 10 (e.g., top vs. bottom) at a given cross-sectional area. Changing these ratios effects the radius of the bend and can be controlled to suit a given application. For example, bending of the wrist will involve a different radius than bending at the knee. To cycle actuation of the actuator 10, the pressure in the envelope can be fluctuated above (to actuate) and below (to de-actuate) the wrinkling pressure of the envelope.

Folding

Figure 26:
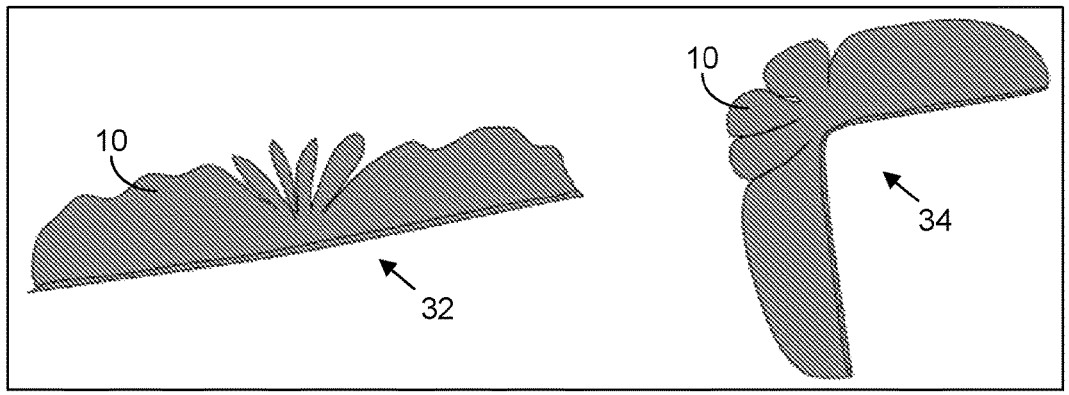
FIG. 26 shows a folding soft textile actuator 10 in an uninflated 32 and inflated 34 state.

This radius can even be honed to a single point in order to create a folding actuator. These actuators have their center of rotation located on the actuator, itself (see FIG. 26, where the actuator 10 is shown uninflated 32 and inflated 34).

Twisting Actuators

Figure 27:
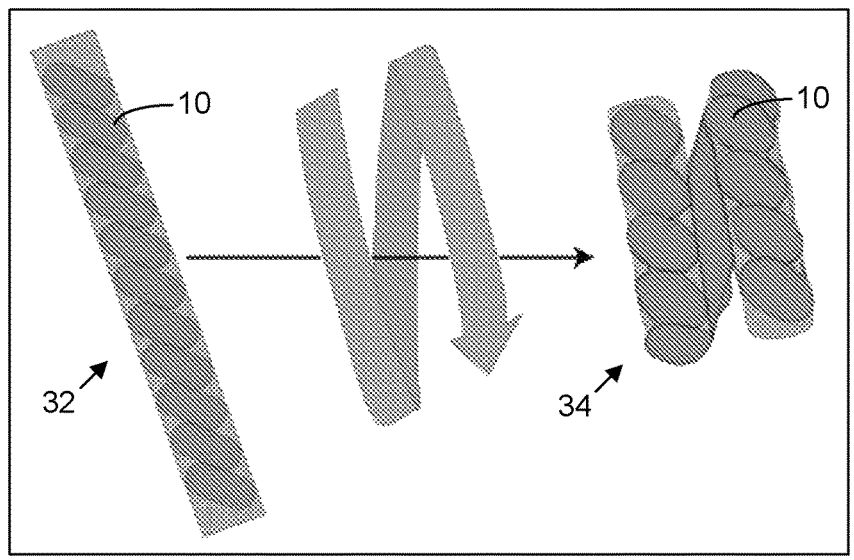
FIG. 27 shows a twisting textile actuator 10 in an uninflated 32 and inflated 34 state.

Twisting is a similar concept relying on a path length differential of the envelope on either side of an actuator. A twisting motion can be easily achieved with a segmented method where the bodies of the segments are set at angles to one another. When the segments of the actuator 10 are inflated, the offset of the broadest portions creates a helical bending shape (see FIG. 27).

Extending Actuators

Figure 28:
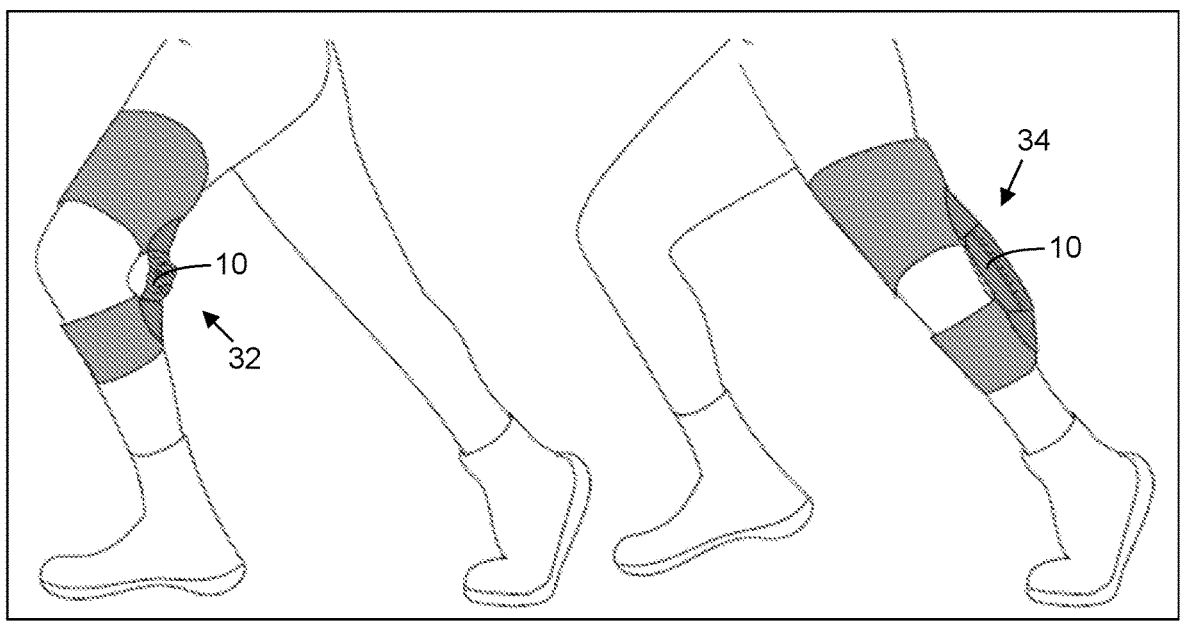
FIG. 28 shows an extending textile actuator 10 providing knee-assist actuation.

Extending motions are particularly effective for pushing loads with high amounts of force. For example, in order to extend the knee, a cylindrical actuator can be placed behind the knee. During the gait cycle, the knee flexes (bends), forcing the actuator into a wrinkled non-equilibrium state. As the actuator 10 is actuated, it wants to move towards its equilibrium state, which is a cylinder, and pushes the lower leg along with it (see FIG. 28). Extending actuators can rely on a load to deform them in their pre-inflated shape or can incorporate some other mechanism, such as elasticity, to ensure they return to a deformed shape before inflation.

Unfolding Actuators

Figure 29:
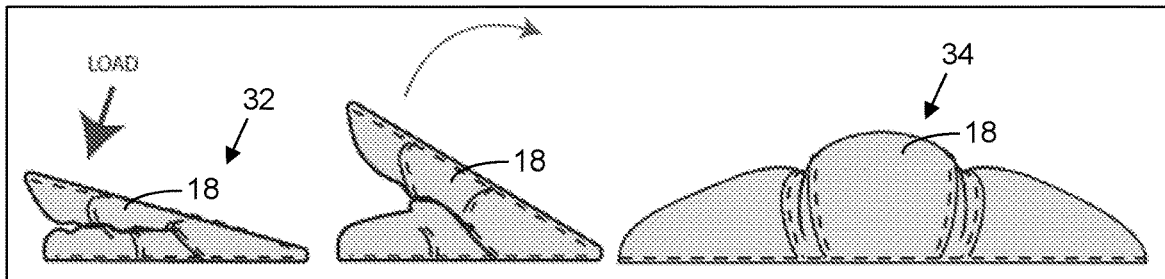
FIG. 29 shows an unfolding textile abduction actuator 18 undergoing an actuation from an uninflated 32 to inflated 34 state to displace a load.

A particularly useful form of an extending actuator is an unfolding actuator, such as the ABA used in our assistive shoulder device. These actuators are designed to fold in half latitudinally when deformed by a load. When inflated, unfolding actuators 10 will rotate on their fold line and separate the load from the ground (see FIG. 29, where inflation proceeds from uninflated 32, at left, to fully inflated 34, at right).

Shortening Actuators

Figure 30:
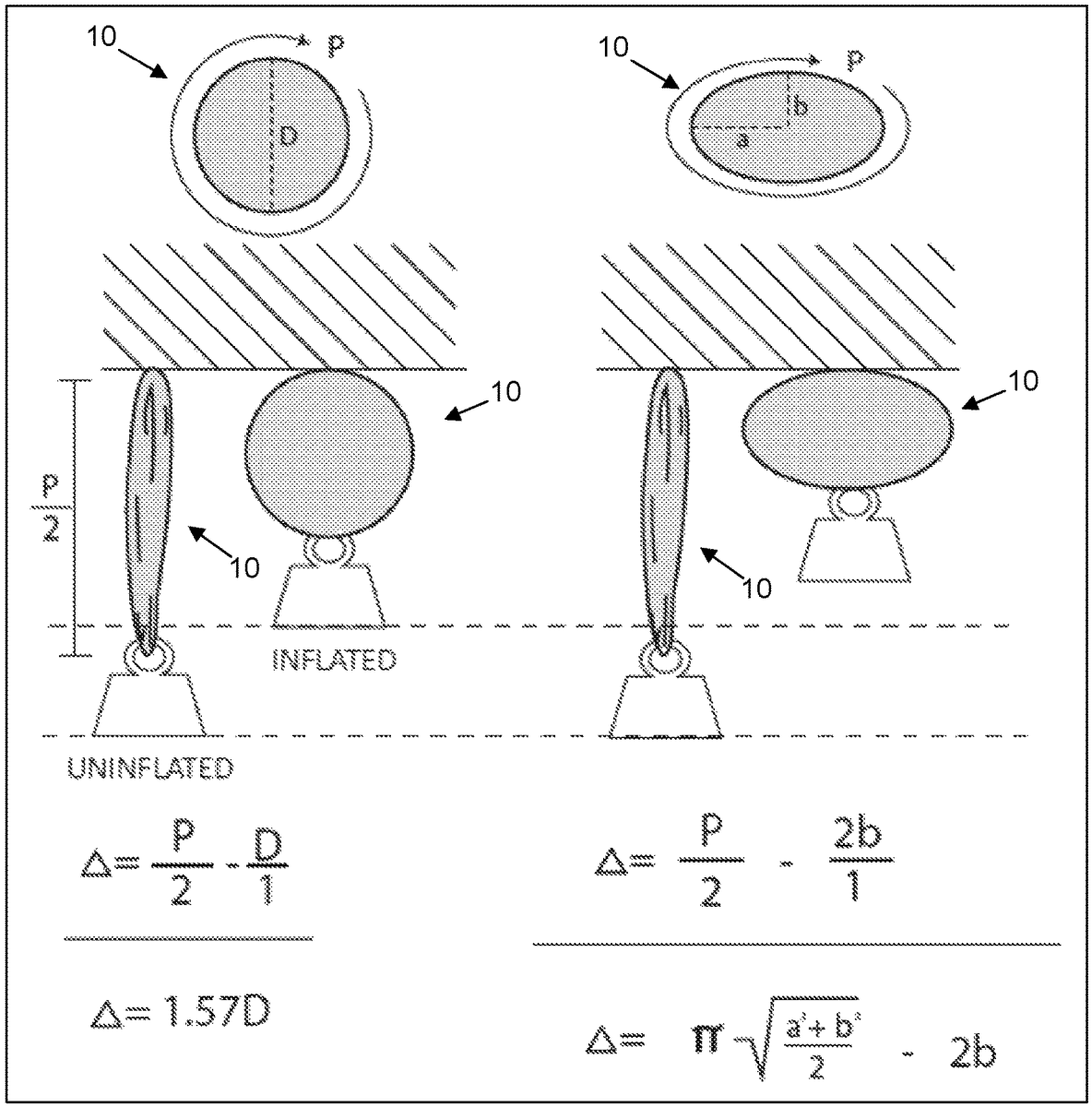
FIG. 30 shows shortening textile actuators 10 that shorten in length (via radial expansion and axial contraction) when actuated; the actuator 10 at left with a pre-determined circular cross-section upon actuation to an equilibrium state undergoes an increase in diameter of 57%, while the actuator 10 at right with a pre-determined elliptical cross-section upon actuation to an equilibrium state undergoes an increase in diameter of 260%.

Shortening actuators can also be produced by creating geometries in which the inflated equilibrium state is shorter than its tensioned (fully elongated) uninflated shape. When the tensioned, uninflated actuator is pressurized, it seeks to expand and return to its equilibrium state where pressure is evenly distributed, thus converting radial expansion into axial contraction. Actuators with the envelope having the pre-determined geometry, unlike existing extensible shortening actuators, can be designed with geometries that maximize the delta between the pre-inflated and inflated shapes. For example, an embodiment of the actuator with an equilibrium shape having a circular cross section can only achieve a delta of 57% of its diameter. An embodiment of the actuator 10 with an elliptical cross section, however, with its long axis perpendicular to the axis of a load, can reasonably achieve a delta of 260% of its diameter (see FIG. 30).

b. Semi-Constrained Motions

Figure 31:
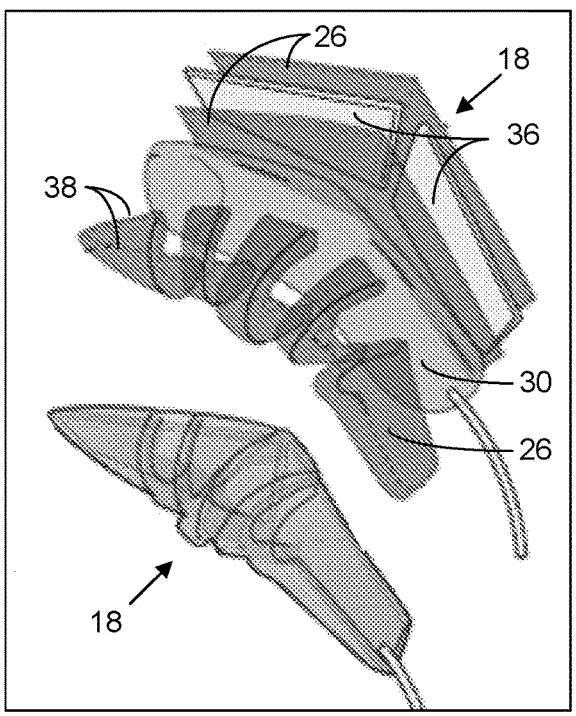
FIGS. 31 and 32 shows an abduction textile actuator 18 including semi-rigid/stiff plates 36 that do not substantially deform with actuation and that create a hinge to ensure alignment of the actuator 18 upon actuation. The abduction actuator 18 also includes a textile envelope 26 (in the form of panels joined with stitching 38) and a bladder 30.

Rigid, stiff, or flexible inclusions 36 can be integrated into the actuators (see FIG. 31) to restrict motion in a specific zone and to promote motion in other zones, allowing crucial constraints in an otherwise under-actuated system. This design allows the benefits of both constrained and under-actuated systems. By using select stiff inclusions (that substantially resist deformation with actuation), the actuator 10 can resist shear forces, sequence motions, control paths of actuation, ensure alignments, and/or ensure or prevent peak contact forces, while still remaining compliant and transparent (non-restrictive) to the user.

Figure 32:
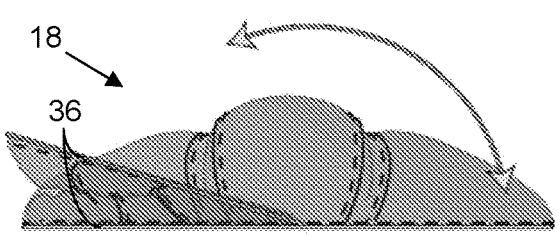

These inclusions 36 can be attached to a soft robot and/or its actuators by numerous methods including, but not limited to, sewing, hook-and-loop attachment, lacing, gluing, heat bonding, or fitting into premade pockets. In one specific embodiment, stiff inclusions 36 can be applied to a bending or extending actuator 10 such that a gap between inclusions 36 creates a hinge perpendicular to the desired plane of rotation; this hinge ensures alignment throughout the inflation cycle, especially at the start of the cycle where the actuator 10 is folded on top of itself (see FIG. 32). In another embodiment, stiff inclusions 36 can be incorporated into fabrics that are pulled both in tension and in shear in order to prevent the expected wrinkling caused by shear forces, such as in the soft cruciate ligaments 54 that attach the abduction actuator (ABA) 18 to the human interface. In a third embodiment, stiff inclusions 36 can be incorporated in between chambers of a multi-chamber extending actuator 10 in order to prescribe a specific path and ensure specific sequences of chamber actuations, such as in a HEFA 20, which pushes and rotates the ABA 18. Here, stiff inclusions 36 also ensure an efficient transfer of force between HEFAs 20 and ABA 18 (see FIGS. 33-35), as the stiff inclusions 36 prescribe the paths of motion by creating a linkage, as shown in FIG. 35.

c. Equilibrium States and Ranges of Motion

The geometry of the actuators can be designed or "programmed" to a specific equilibrium shape so that the actuator's range of motion can be arbitrarily limited despite increasing pressure in the actuator. This functionality is particularly useful in applications where a mechanical limit is necessary for safety or where a specific end state is desired in an under-actuated system.

Figure 36:
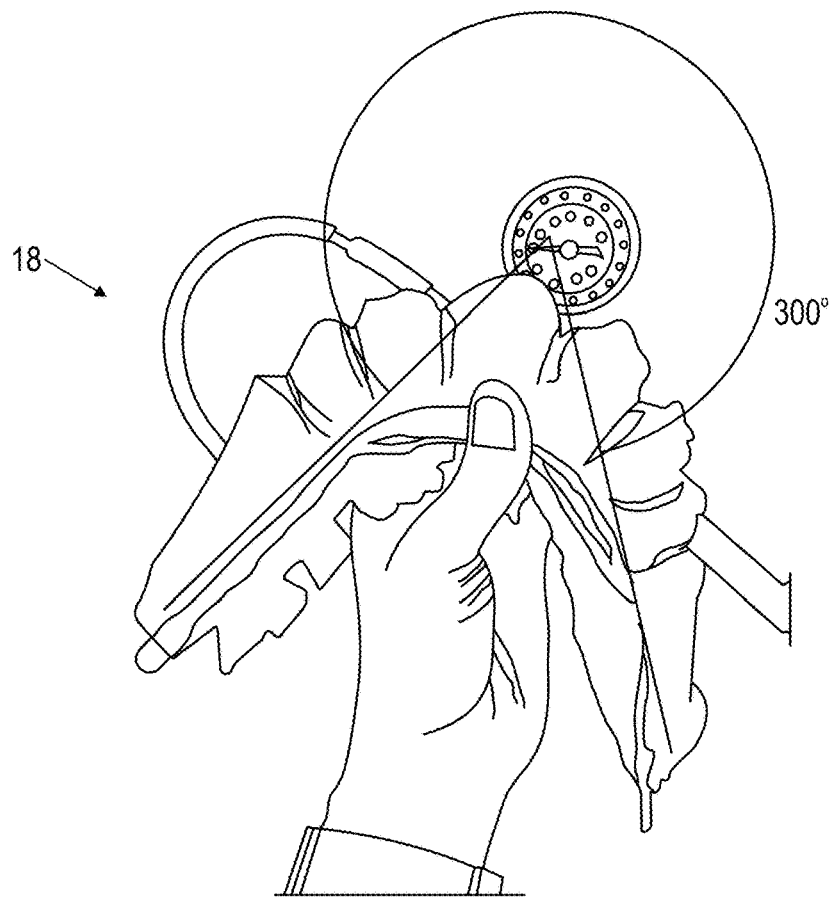
FIGS. 36 and 37 include drawings of an abduction textile actuator 18 for a shoulder-assist device, wherein the textile actuator 18 is designed, via the path lengths of its segmented structure, to only have a 165° range of motion via its actuation, as shown in FIG. 37.
Figure 37:
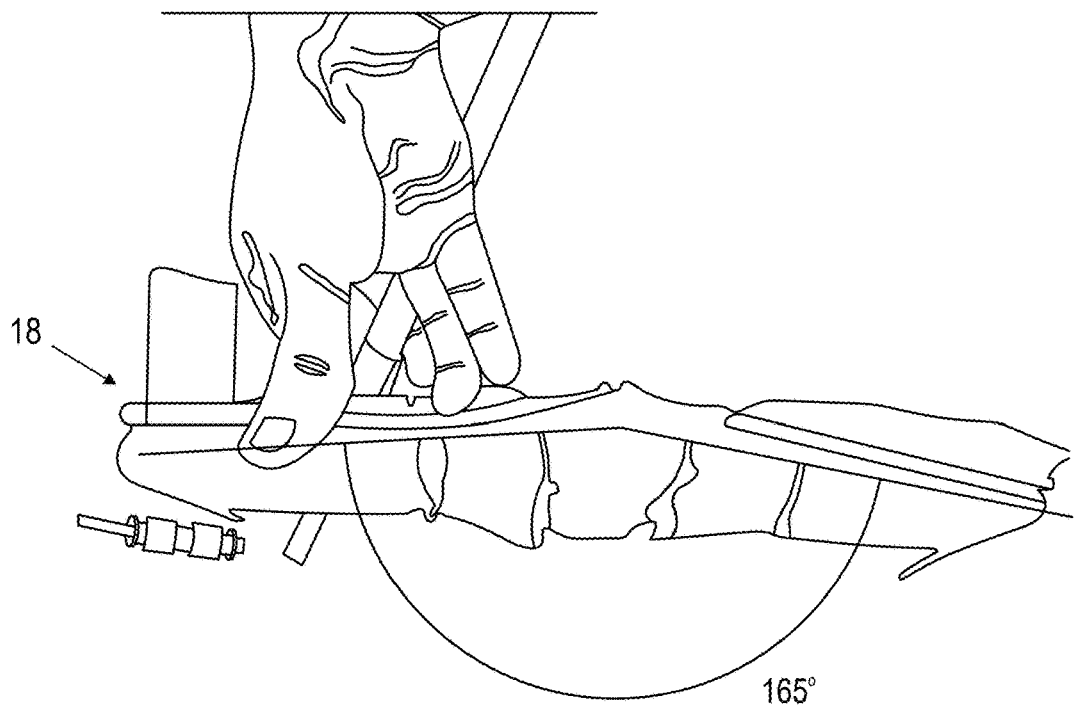

An example of an equilibrium state for safety can be found in the abduction actuator (ABA) of a shoulder-assistive device. Initial prototypes of this actuator 18 had a working range of 300 degrees of rotation; since this working range is far more than the human arm can abduct, the actuator 18 was designed to only have a 165 degree range of motion (see FIGS. 36 and 37). This equilibrium state was created by the segmented geometry of the ABA 18. The path lengths of the envelope along either side of the actuator 18 were such that the ABA 18 rested at 165 degrees when inflated. Net external forces decrease as the angle of the actuator 18 approaches the equilibrium angle. Once the equilibrium angle is reached, all internal forces are balanced, leading to a net zero output force.

Similar applications can be used for a controlled end state, for example, in an industrial application where the knees needed to be bent at 7 degrees, rather than relying on a limiting strap or some other means of ensuring the angle, the actuator 18 can be designed to have an equilibrium point at 7 degrees.

d. Geometric Design for Specific Pressure/Stiffness Relationship

It is often desirable, from a control and actuation perspective, to regulate the relationships between input and output. However, in soft fluidic actuators, the relationship between pressure input and force output can vary drastically throughout inflation due to the effects of wrinkling. Wrinkling results in a dramatic reduction of an inflated body's stiffness and ability to apply a force. Wrinkling occurs when the local stress in the textile becomes compressive as textiles buckle under compressive stress. This phenomena has been investigated and experimentally validated in studies exploring the nucleation criteria of wrinkles in inflatable beams and inflatable cones. Regardless of whether the desired pressure/stiffness relationship is linear or non-linear, it is helpful to be able to specify the parameters of the relationship.

Linear Pressure/Stiffness Relationship

Figure 38:
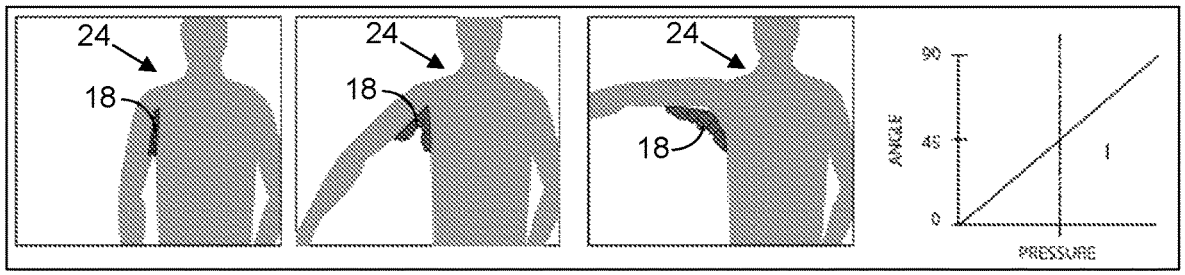
FIGS. 38 and 39 provide an illustration of shoulder actuation using a segmented textile abduction actuator 18 (FIG. 38) and a non-segmented textile abduction actuator 18 (FIG. 39); as shown, the segmentation provides for a near-linear relationship between the pressure level in the actuator and the displacement angle of the actuator due to that pressure.
Figure 39:
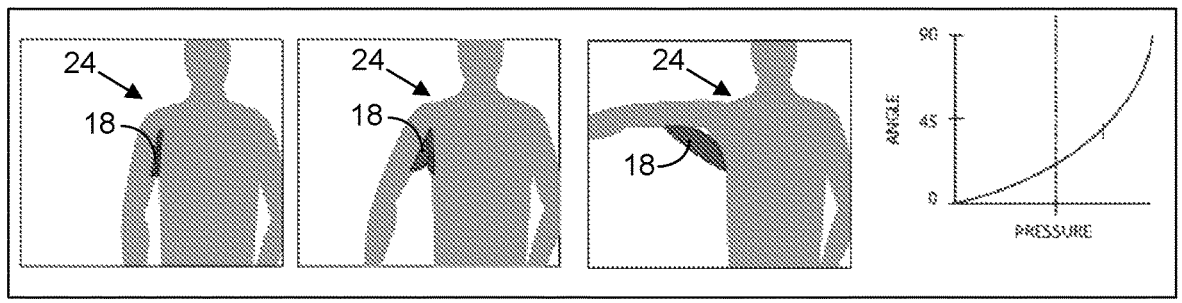

One method of preventing wrinkling in the actuator is to add segmentations to the actuator envelope (e.g., via nodules formed by cut-and-sew patterning at periodic spacings along the length of the envelope). This segmentation serves to isolate the effects of wrinkling; should one segment wrinkle, it does not cause the entire actuator to buckle as would be the case with a non-segmented volume. As the pressure continues to increase inside the actuator, the wrinkling pressure is met in the compromised segment, and it returns to its unwrinkled state. By changing the number, size or shape of segments, we can therefore alter the relationship between pressure and wrinkling and, therefore, stiffness. Experimentally, segmenting achieves a linear relationship ($R^2=0.98$) between input pressure and the output angle, $\theta$, under fixed load. As previously mentioned, segmenting can also be used to increase path length and create potential for motions (e.g., bending and folding actuators) [see FIGS. 38 (segmented actuator 18) and 39 (non-segmented actuator 18), where the images show the actuator 18 with 0% pressure at left, at 50% pressure at center, and at 100% pressure at right, followed by a plot of actuator angle as a s function of pressure].

In one embodiment, segmenting is provided to linearize stiffness in the ABA 18 of a shoulder-assistive device. This actuator 18 serves to abduct the arm to any desired degree from 0 to 90. Wrinkling in this actuator 18 would result in a "squishy" actuator until pressure levels overcame wrinkling, at which time, the actuator 18 would become very stiff. By reducing the effects of wrinkling, we can eliminate the sudden spike in stiffness and thereby have much more accurate control of the arm at all pressures and all angles from 0-90°.

Potential for Non-Linear Profiles

Figure 40:
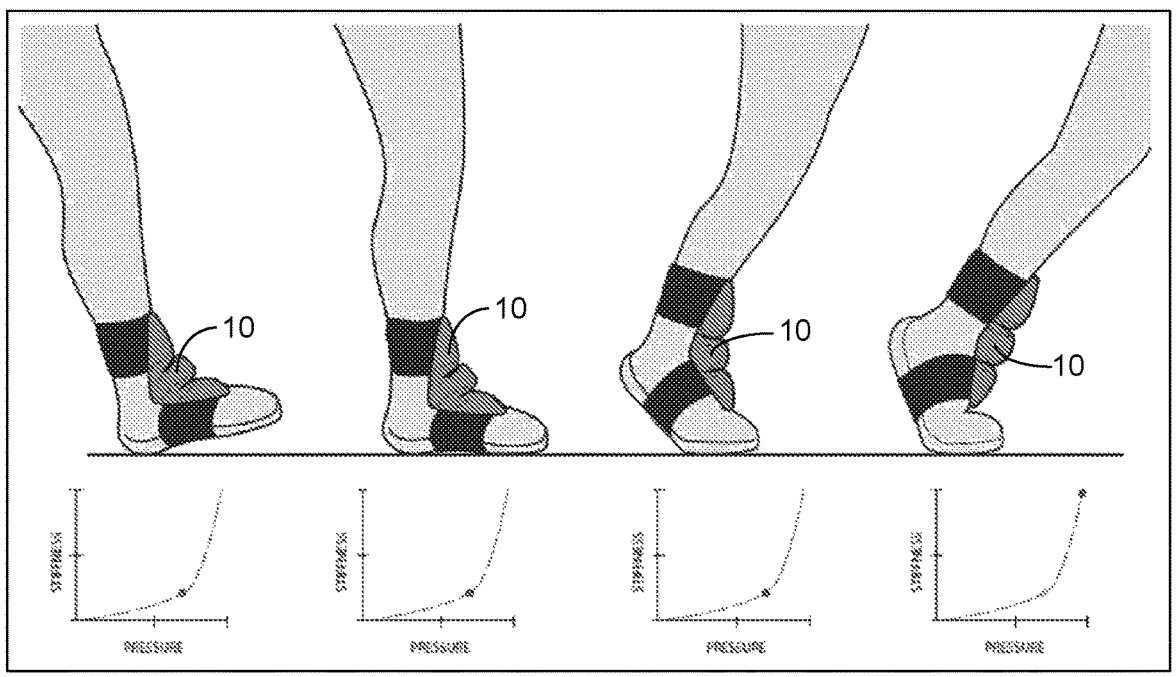
FIG. 40 shows a soft textile actuator 10 with a non-linear pressure-stiffness profile, wherein a specific "wrinkling pressure" of the actuator allows for a desired maintenance of pressure in the actuator 10, wherein a decreased stiffness is leverage to maintain a compliant actuator 10 in the swing and stance phase of the gait (first three images from left). Then during toe-off (last, right-most image), when actuation and stiffness are needed, a small increase in pressure triggers a jump in stiffness as the wrinkling pressure is exceeded.

It may also be useful at times to create a specific non-linear relationship between stiffness and wrinkling. An example of this utility is in actuating the ankle during a gait cycle with a low-pressure system, as shown in FIG. 40. The ankle requires a large amount of force to actuate; therefore, a low-pressure actuation system needs a high-volume actuator. With a normal gait cycle being relatively high frequency (1.7 steps per second) and an actuation period being only a fraction of a step, the actuator 10 would need to cycle relatively quickly. By designing an actuator 10 with a specific "wrinkling pressure", one can maintain that pressure in the actuator, leveraging the decreased stiffness to maintain a compliant actuator 10 in the swing and stance phase of the gait. Then, during toe-off; when actuation and stiffness are needed, a small increase in pressure will trigger a jump in stiffness of the actuator 10 as the wrinkling pressure is exceeded (see FIG. 40).

Actuator Control Modes

The following actuator control modes can be implemented by a controller:

Continuous passive motion mode allows a pre-set trajectory for joints that can be repeated a set number of times to displace the joints through their full range of motion at a specified speed. We envision this mode may be the most useful for some patients. For example, motion profiles can be recorded from the therapist and played back in this mode.

Functional assistance mode seeks to anticipate the desired motion of the user by detecting wearer intent or some volitional motion/activity and then assists by amplifying it to a safe level specified by the therapist. The stroke and patient population often have some residual movement but lack the necessary strength or persistent coordination to perform functionally useful tasks. In this mode, the system continuously monitors the position of the patient's joints and, if movement above a certain threshold is detected, then the actuators will be pressurized for a pre-programmed time for that patient. Such a model is possible due to the compliant nature of the robot. This mode permits adaptation with recovery, as the minimum threshold can be modified to encourage additional motion prior to assistance.

Soft Wearable Robot for the Shoulder

Additional discussion of embodiments wherein a configuration of the soft actuators are used to assist individuals in performing activities using shoulder muscles is provided, below. The soft wearable robot for the shoulder assists shoulder abduction (AB)/adduction (AD) and shoulder horizontal flexion (HF)/extension (HE) (FIG. 47).

To enable a discrete wearable robot, a goal was set to reduce the profile of the actuators, ideally repositioning them to the underside of the human arm. This repositioning is important to increase acceptability by the user and by the community in daily life. A key factor in reducing the robot's profile was to reduce the volume of the actuators while still delivering the requisite output forces and moments. A further consequence of reducing the profile of the actuators is that the available moment arms were also reduced. The total moment/force that can be generated by a given size of a pneumatic actuator is a function of the supply pressure, which we chose to restrict to 200 kPa (29 PSI), as this is the pressure limit of many small electric compressors. This pressure limit resulted in a tradeoff being made between actuator sizing and the desired output moment/force. To abduct the arm, moments on the order of 15-20 Nm (calculated using anthropomorphic data) are to be generated to overcome the weight of the arm and up to 1 kg additional load held by the user.

The wearable robot, in this embodiment, includes a vest 50 to which two types of textile-based actuators 18 and 20 are attached (FIG. 48). The vest 50 is constructed of neoprene, also known as polychloroprene (Seattle Fabrics, USA), and is reinforced with a flexible plate 58 below the wearer's axilla to securely anchor the soft cruciate linkage (SCL) 54 and the horizontal extension/flexion actuators (HEFAs) 20. The abduction actuator (ABA) 18 is coupled to the upper arm via a padded arm wrap 52 that has hook-and-loop fasteners (e.g., VELCRO fasteners from the Velcro Companies) to allow for adjustment to individual users 24. To prevent the wrap 52 from sliding, the wrap 52 is tethered to the vest 50 via a strap 56. The HEFAs 20 are sewn to the edges of the ABA 18 and to the flexible plate 58 on the vest 50, while the SCL 54 is used to connect the ABA 18 to the flexible plate 58 on the vest 50.

Soft Cruciate Linkage (SCL)

Figure 49:
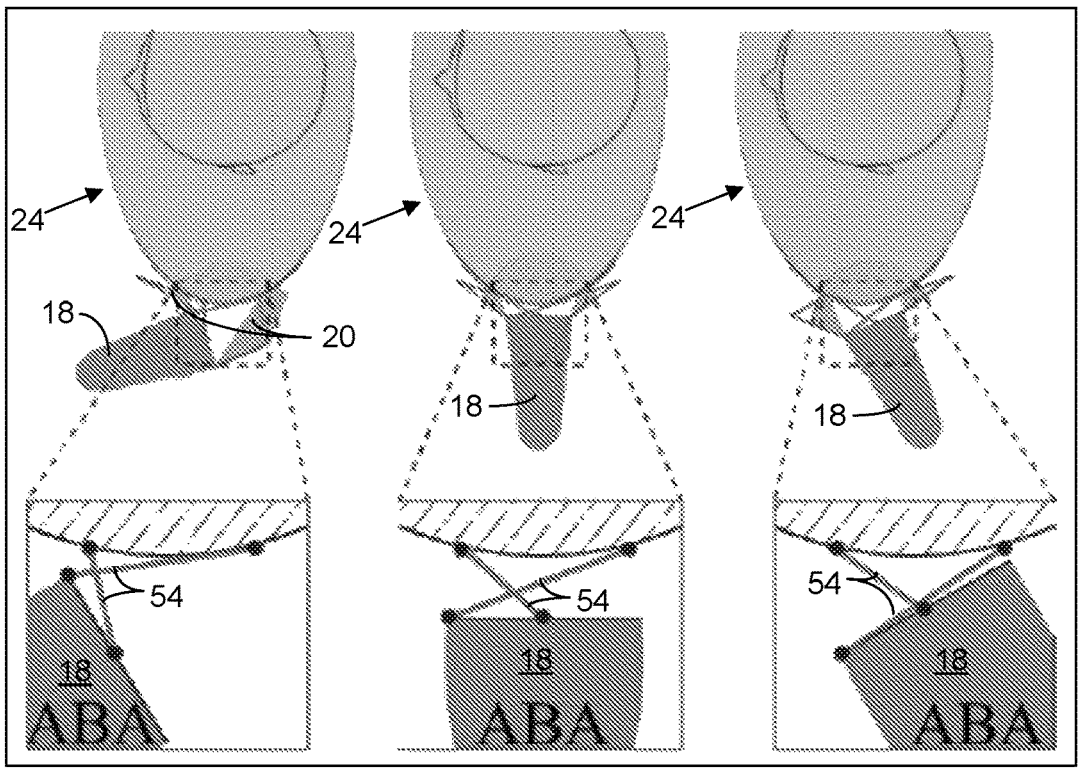
FIG. 49 is an overhead view of the soft cruciate linkage (SCL) 18 working to achieve horizontal flexion (HF) and horizontal extension (HE).

A four-bar linkage system (a soft cruciate linkage) 54, mimicking the cruciate ligaments, was developed to connect the ABA 18 to the vest 50 as illustrated in FIGS. 48 and 49 (via lines 18). The linkage 54 allows the rotation of the ABA 18 about the vertical axis while minimizing horizontal and vertical displacement. An asymmetric arrangement of the four-bar linkage 18 was chosen to allow for maximum horizontal flexion (HF) while limiting horizontal extension (HE), which is depicted in the lower portion of FIG. 49. Sail cloth (Dimension, USA) reinforced with aramid fiber (KEVLAR fiber from DuPont) was used to make these embodiments of the linkages 54. The four-bar linkage mechanism is further explained, below.

Abduction Actuator (ABA)

Figure 50:
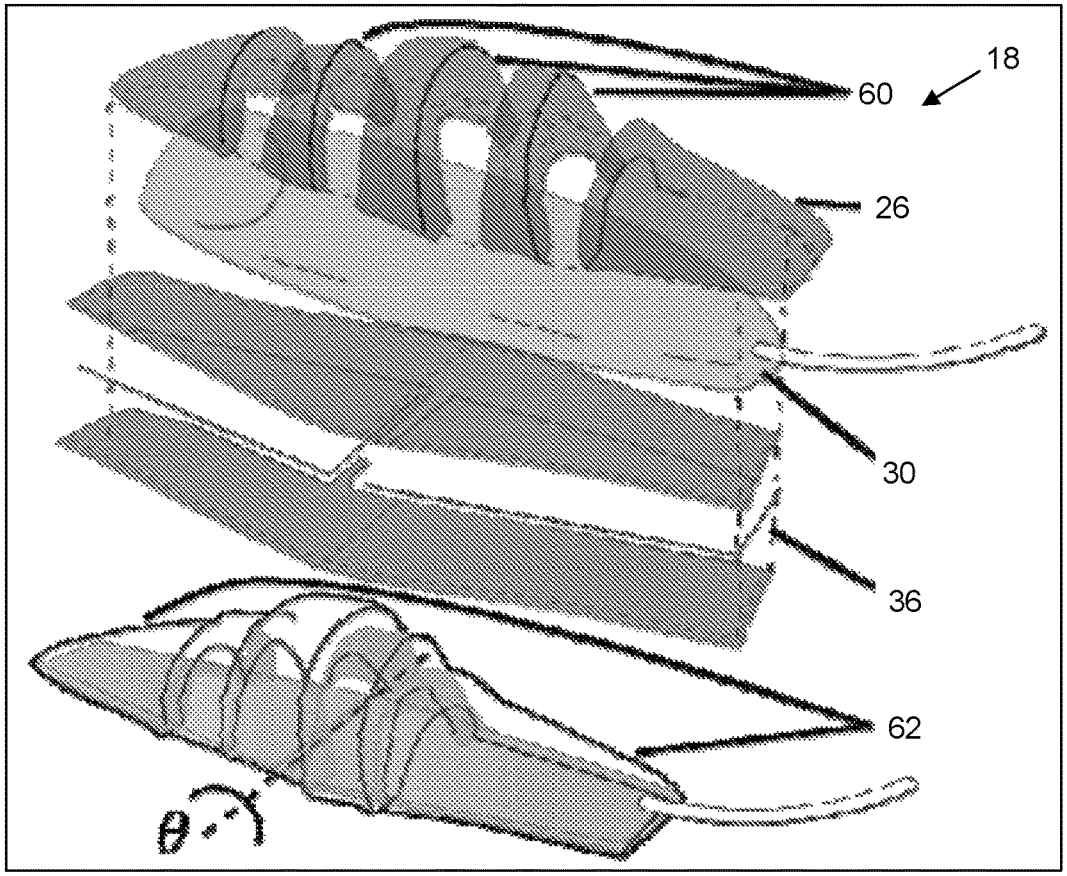
FIG. 50 is an exploded view of an abduction actuator (ABA) 18, including intermediate and distal chambers 60 and 62.

The ABA 18 previously mentioned can comprise a segmented chamber made of inextensible textile (Weathermax, USA) attached to a spine including two flexible plates 36 connected via a flexible hinge (FIG. 50). The flexible plates 36 help resist misalignment between segments 60, 62 and are located between two layers of textile 26 with the dividing stitching between them acting as a hinge. An oversized bladder 30 made of heat-sealed thermoplastic polyurethane (TPU) (Fiberglast, USA) is inserted into the textile component to form an inflatable airtight volume. The bladder 30 is oversized as its function is solely to retain a fluid, such as air, while the fabric structure is designed to absorb and distribute the stresses due to pressurization. Shoulder adduction (i.e., the motion assisted by gravity), is not actuated, as the robot is initially intended to target upright (i.e., non-reclined) users. Shoulder adduction is achieved by simply deflating the ABA 18 in a controlled fashion.

Figure 52:
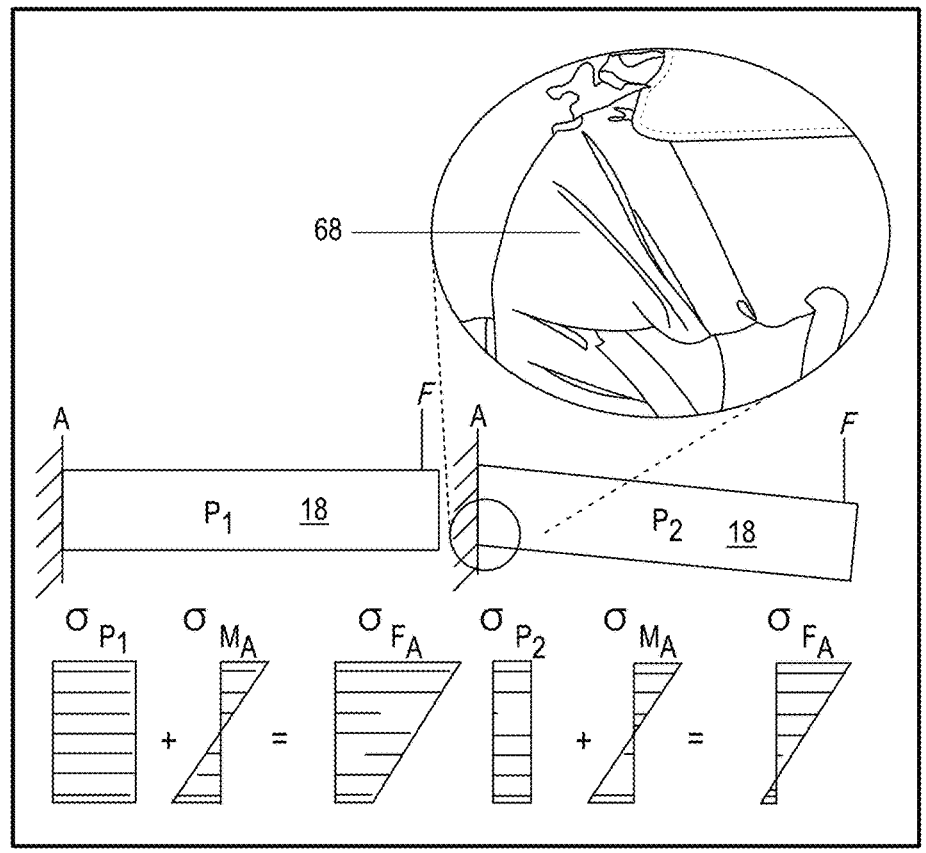
FIG. 52 shows the effect of wrinkling 68 with identical moments applied where $P_1>P_2$. $P_2$ provides insufficient tensile preload to prevent buckling.

The main chamber of the actuator 18 has been segmented into five sub-chambers 60, 62 to limit the effects of wrinkling. Wrinkling results in a dramatic reduction in the actuator's stiffness and ability to support load. Wrinkling occurs when the local stress in the textile becomes compressive as textiles buckle under compressive stress. This phenomena has been investigated and experimentally validated in studies exploring the nucleation criteria of wrinkles in inflatable beams and inflatable cones. Inflation of the actuator 18 generates a tensile stress preload in the textile to overcome any compressive stresses present; and this effect is illustrated in FIG. 52, where the greater pressure, $P_1$ ($P_1 > P_2$), generates sufficient tensile stress ($\sigma_{P_1}$) throughout the beam to exceed the compressive stress from the applied moment ($\sigma_{MA}$), thus preventing the formation of a wrinkle ($\sigma_{FA}>0$). Should one segment wrinkle 68, it does not cause the entire actuator 18 to buckle, as would be the case with a single segment actuator. By reducing the wrinkling pressure (i.e., the minimum pressure to avoid wrinkling), it is reasonable to assume that a more precise relationship between pressure and output moment for a given angle can be achieved.

Figure 51:
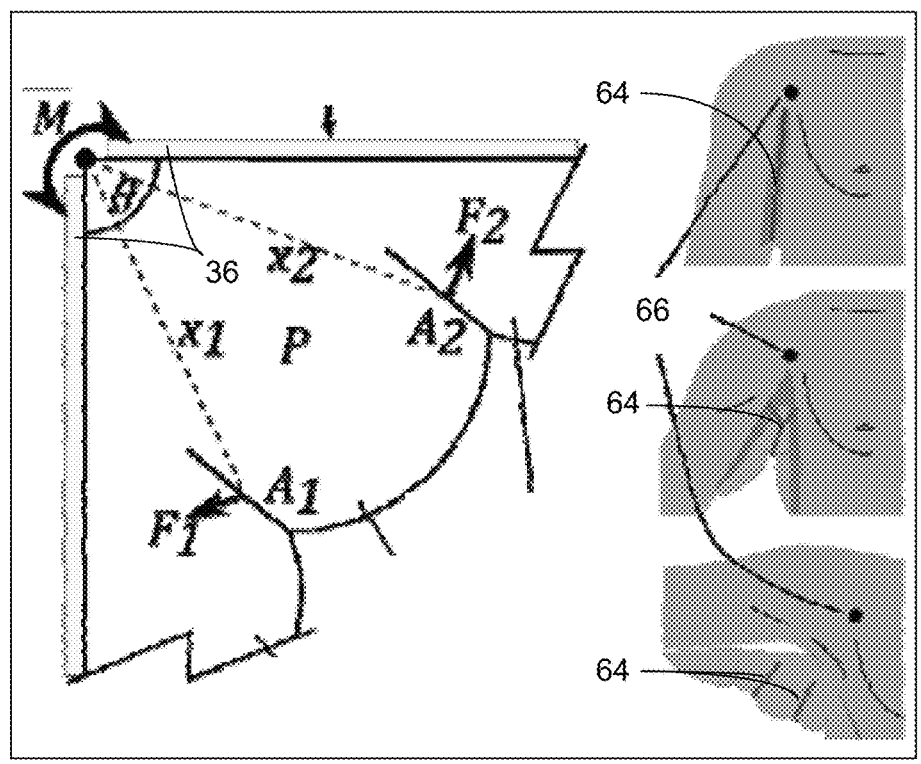
FIG. 51 is a force diagram of the abduction actuator (ABA) 18 and visualization of contact area 64 with center of rotation (COR) 66 of the shoulder. $X_{1,2}$ is the distance from the COR 66 to the center of pressure of $A_{1,2}$, which is used to calculate $F_{1,2}$ using the internal pressure, P.

The total moment generated by the actuator 18 is approximately the sum of the moments between the three intermediate chambers 60 in FIGS. 50 and 51. The two distal chambers 62 (FIG. 50) minimally contribute to moment generation given their reduced moment arm. The theoretical center of rotation (COR) 66 of the actuator 18 is located at the joint of the two flexible plates rather than co-located with the shoulder joint. In a rigidly framed system, a prismatic joint would be used to allow for translation of the arm wrap during rotation. However, due to the flexibility of the plates 36 and the compliance of the textile elements, the actuator may be directly coupled with the human body without over-constraining the user.

To evaluate and characterize the abduction actuator, a test fixture was developed, comprising a six-axis load cell (Gamma 15-50, ATI-IA, USA) to record the applied moments and a 1024 count quadrature encoder (E6B2, Sparkfun, USA) to record actuation angle. Pressure was monitored with a 700-kPa pressure transducer (100PAAA5, Honeywell, USA). All data was captured at 500 Hz using a NI PCIe 6259 data acquisition (DAQ) system (National Instruments, USA) and SIMULINK software (Mathworks, USA). The angle of actuation can be fixed or left free to rotate. Static moment tests were performed by locking the actuator at a number of discrete angles to evaluate the moment output of the actuator with respect to pressure. Additionally, we sought to verify the linearity of the segmented actuator output motion with respect to pressure by allowing for free rotation and applying a fixed load as the actuator was inflated.

Figure 53:
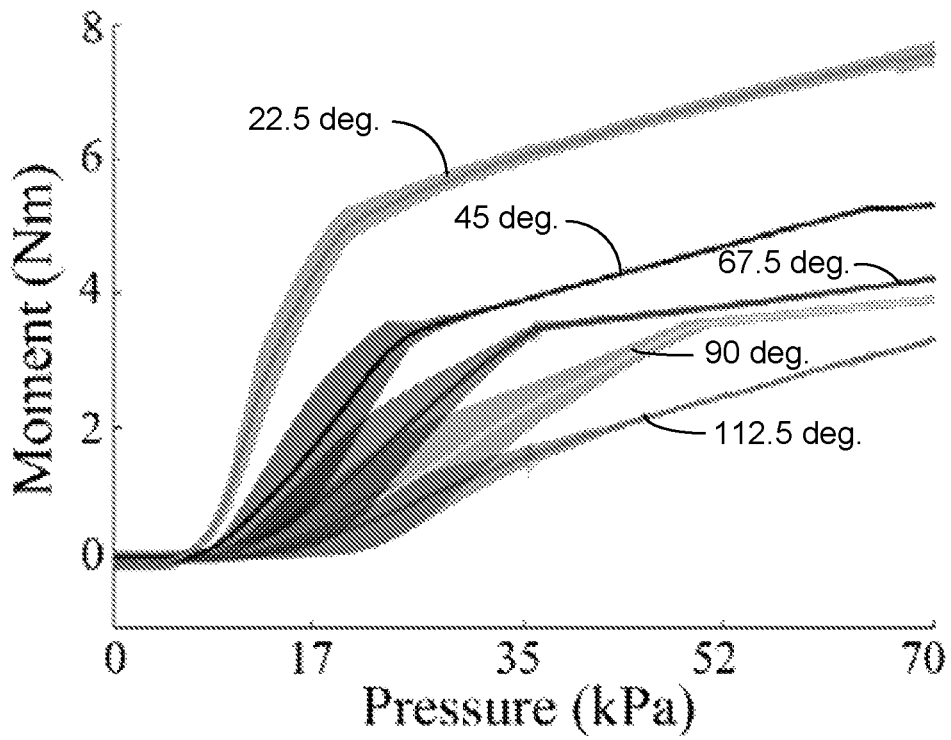
FIG. 53 plots experimental results of moment output at fixed angles (indicated in degrees in the chart), where the shaded area represents standard deviation.
Figure 54:
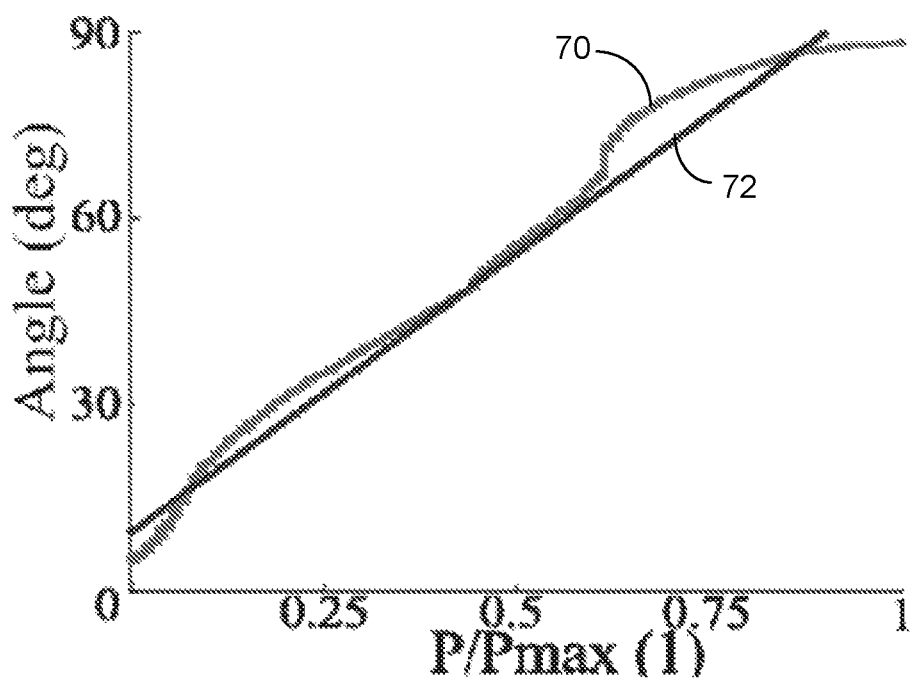
FIG. 54 plots experimental results (data 70 and fit 72) of the relationship between pressure and angle under a fixed load, where $P_{max}$ is the maximum pressure recorded.

FIG. 53 and FIG. 54 report the results of our experimental evaluation of the ABA 18. In FIG. 53, the relationship between pressure and output moment at a number of fixed angles is presented. Two distinct regions exist, the first of which is a region with greater variability as indicated by the increase in standard deviation (SD) that we attribute to the changing contact area between the chambers due to the wrinkles followed by a linear region where we assume wrinkling does not occur due to the increased internal pressure and the contact area remaining relatively constant. The changing contact area is due to the folds of a wrinkle containing some textile, which is then no longer part of the contact area, as it's within the fold. In FIG. 53, it is also evident that the generated moment decreases as the angle, $\theta$, increases. This is an expected behavior, as for smaller values of $\theta$, there is additional contact area between the subchambers of the actuator 18, increasing the effective area for moment generation and the moment arm with a resulting increase in applied moment (at the contact areas 64 illustrated in FIG. 51). The area for moment generation continues to decrease with increasing actuator angle, $\theta$, as each segment tends towards a quasi-spherical equilibrium state. In FIG. 54, a linear relationship ($R^2=0.98$) is apparent between input pressure and the output angle, $\theta$, under fixed load. This linear relationship between pressure and abduction angle is ideal, as it greatly simplifies the open loop control of the actuator 18.

Horizontal Extension/Flexion Actuator (HEFA)

Figure 55:
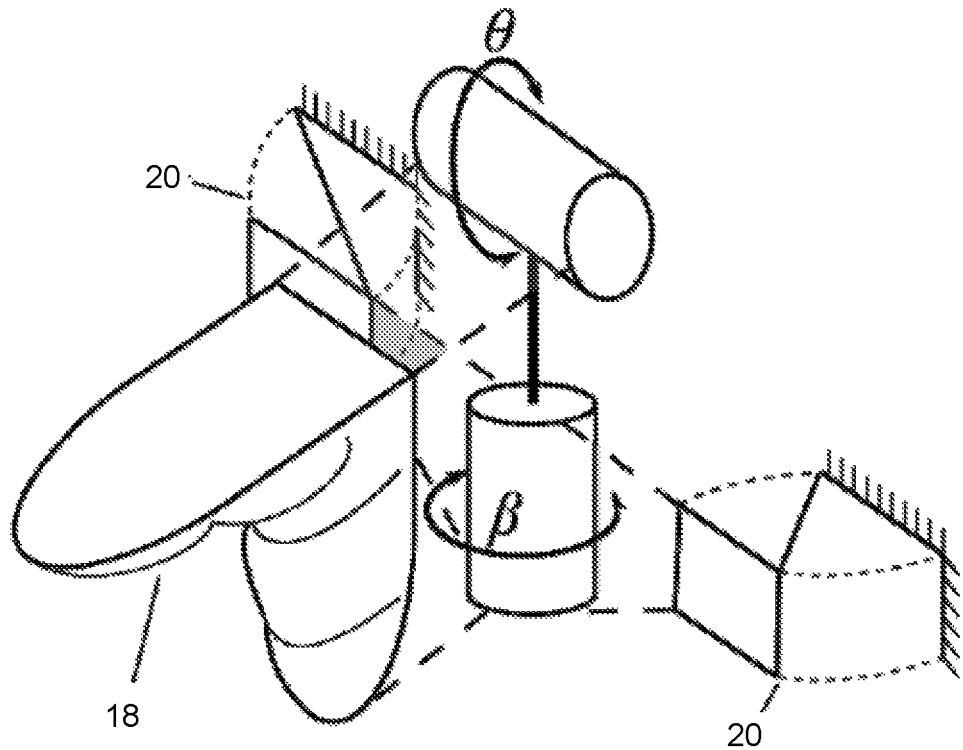
FIG. 55 is a kinematic model of an abduction actuator (ABA) 18 and horizontal extension/flexion actuators (HEFA) 20.

To actuate the second degree of freedom (DoF) of the shoulder (i.e., horizontal extension/flexion motion), we developed a horizontal extension/flexion actuator (HEFA) 20 (see FIGS. 33 and 34). To decouple abduction motion from horizontal extension/flexion, we designed the HEFA 20 to apply rotational motion to the ABA 18 (FIG. 55). To achieve both extension and flexion, an antagonistic pair of actuators 20 is used, as gravity cannot be employed as in the case with adduction.

Figure 56:
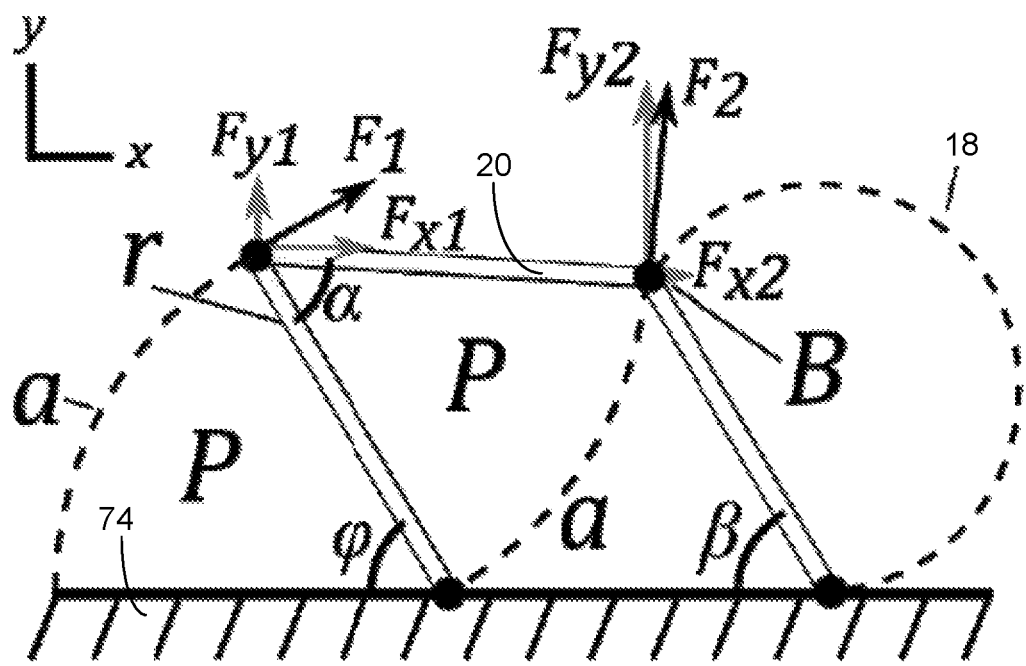
FIG. 56 is an overhead force diagram of a horizontal extension/flexion actuator (HEFA) 20 attached to an abduction actuator (ABA) 18 where ground is to the torso 74.

Each HEFA 20 includes two wedge-shaped chambers in series with a common air supply, which, when combined with the SCLs 54, results in a four-bar linkage that transmits compressive force to the ABA 18 when the HEFA 20 is inflated, as represented in FIG. 56. As with the ABA 18, the HEFA 20 is constructed of an inextensible textile envelope 26 with an internal airtight TPU bladder 30. The trajectory of the interface point between the HEFA 20 and the ABA 18 (point B, FIG. 56) is the arc traced by the edge of the ABA 18 as it rotates about its opposite edge. When uninflated, the HEFA 20 folds flat with $\alpha$ and $\phi$ equal to 0 degrees. By varying the length of the flexible plates, their width, w, and the arc, a (FIG. 56), it is possible to achieve different stroke and force profiles. The top flexible plate generates a moment from the inflation of the top chamber while also transmitting force from the moment generated by the bottom chamber. No flexible plate is required under the bottom chamber, as the bottom chamber is mounted to the flexible plate of the vest. We observed that the angle, $\alpha$, is consistently smaller than the angle, $\phi$, at any pressure; and we theorize that this effect is due to the larger deformation of the top flexible plate with respect to the bottom plate.

The following equations describe the forces generated by the single chambers of the actuator; as derived from the free body diagram depicted in FIG. 56:

$$F_{x1} = \frac{Prw\sin\phi}{2}; \quad (1)$$

$$F_{x2} = \frac{k(i)Prw\sin(\phi - \alpha)}{2}; \quad (2)$$

$$F_{y2} = \frac{k(i)Prw\cos(\phi - \alpha)}{2}. \quad (3)$$

$F_2$ decreases as $\alpha$ approaches $\alpha_{equilibrium}$. $\alpha_{equilibrium}$ is the maximum $\alpha$ angle that is achievable by the pressurized top chamber, and it is calculated based on the arc length, a, of the textile and r, which is the radius of the actuator. Once $\alpha$equilibrium is reached, the pressure applied to the flexible plates is balanced by the stress in the textile, reducing $F_2$ to 0. This effect is captured by the empirically determined function, k, that describes the proximity to equilibrium state:

$$k(i) \approx (1 - e^{-3(i-1)}), \quad (4)$$

where:

$$i = \frac{\alpha}{\alpha_{equilibrium}}. \quad (5)$$

The total forces along x and y directions at point B that the HEFA 20 transmits to the ABA 18 are the sum of the two contributions:

$$F_{BX} = F_{x1} + F_{x2}; \tag{6}$$

$$F_{BX} = \frac{Prw(\sin(\phi) + k(i)\sin(\phi - \alpha))}{2}; \tag{7}$$

$$F_{BY} = F_{y2}. \tag{8}$$

Figure 57:
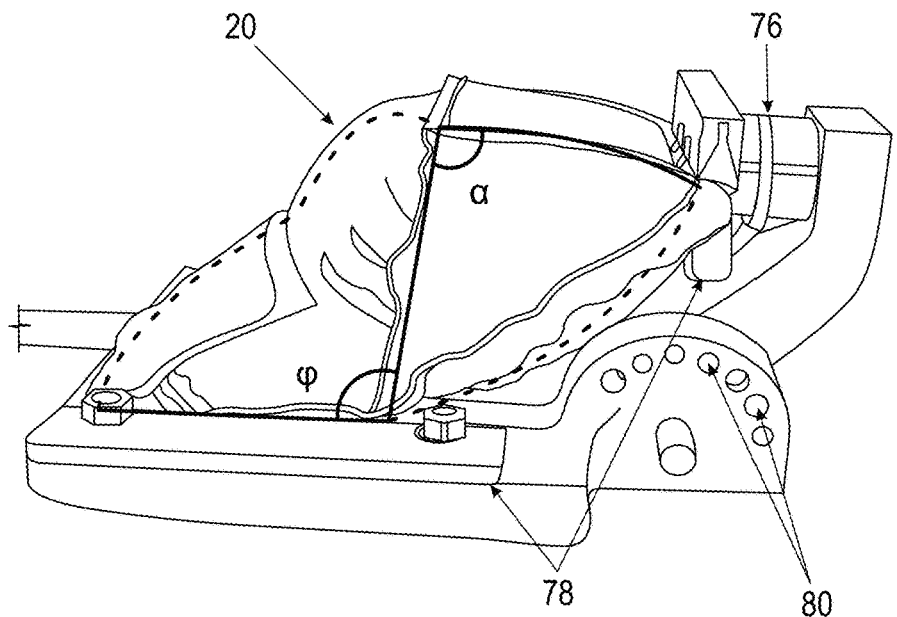
FIG. 57 is a test fixture for a horizontal extension/flexion actuator (HEFA) 20. The text fixture includes a force sensor 76, clamps 78, and indexing 80.

To experimentally evaluate the performance of the HEFA 20, a test fixture (FIG. 57) was developed to measure the force output at a number of discrete angles. A miniature 6-axis load cell 76 (Nano17, ATI-IA, USA) was used to measure the applied forces. Pressure was monitored with a 700 kPa pressure transducer (100 PAAA5, Honeywell, USA), and all data was acquired at 500 Hz by a NI PCIe 6259 DAQ (National Instruments, USA) and processed in SIMULINK software (Mathworks, USA).

Figure 58:
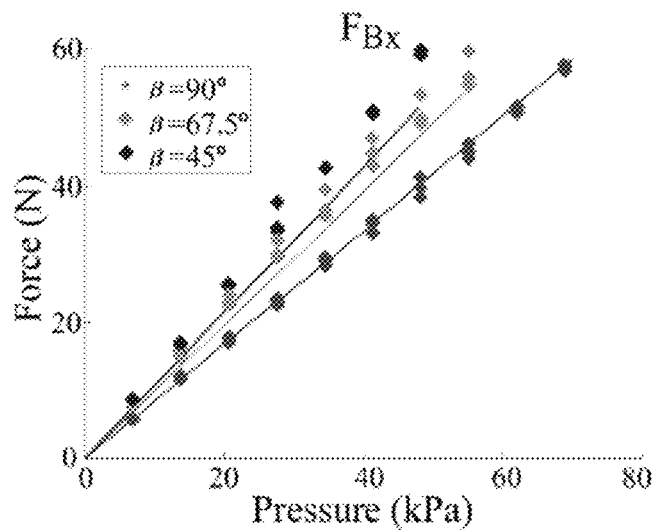
FIG. 58 includes plots providing a comparison for experimental force in x and a numerical model, where the model is represented by the solid lines and the experimental data by the asterisks.
Figure 59:
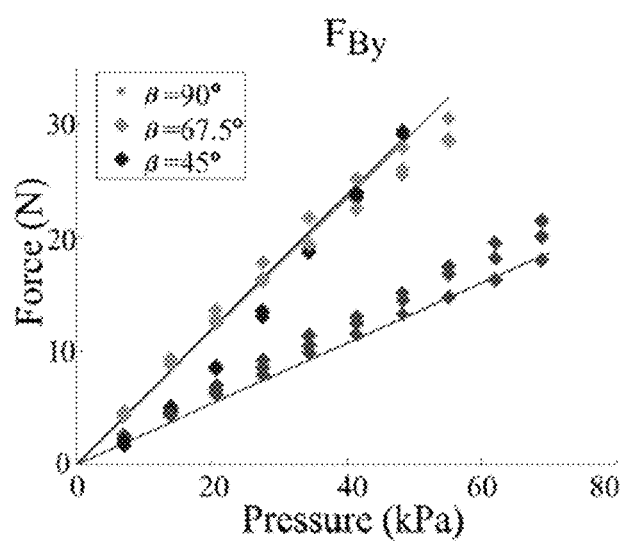
FIG. 59 includes plots providing a comparison for experimental force in y and a numerical model.

The magnitude of the estimated forces correlates well with the recorded experimental data, as is observable in FIG. 58 and FIG. 59. The forces in the x-direction have an average $R_2$ value of 0.94, while the forces in the y-direction have an average $R_2$ value of 0.71.

Conclusion Re Wearable Shoulder-Actuation Robot Exemplification

The prototype described here comprises three individual actuators: one actuator 18 for abduction of the shoulder and two actuators 20 for bidirectional control of horizontal-flexion and extension. The total worn component, in this embodiment, weighs 0.48 kg, folds flat and does not limit the user's motion when unpowered. Preliminary results show large reductions in muscular effort in targeted muscles, demonstrating the feasibility and promise of such a soft wearable robot for the shoulder.

These results pave the way for the use of these soft wearable robots to promote independence in scenarios where cost, portability, ease of maintenance and reduced form factor are paramount, such as home and community use. The techniques employed to fabricate the herein-described wearable robot are highly scalable to mass production by the apparel industry.

Anchoring of the actuators to the wearer may be improved through the use of inextensible textile components and non-slip materials. The integration of soft sensors to measure the angles between various components can provide valuable information for control. For this prototype, pressure was supplied by an offboard compressor; but a portable system with integrated control and power electronics can provide a fully mobile solution.

Actuator Function with Exemplary Cylindrically Shaped Actuator

Figure 60:
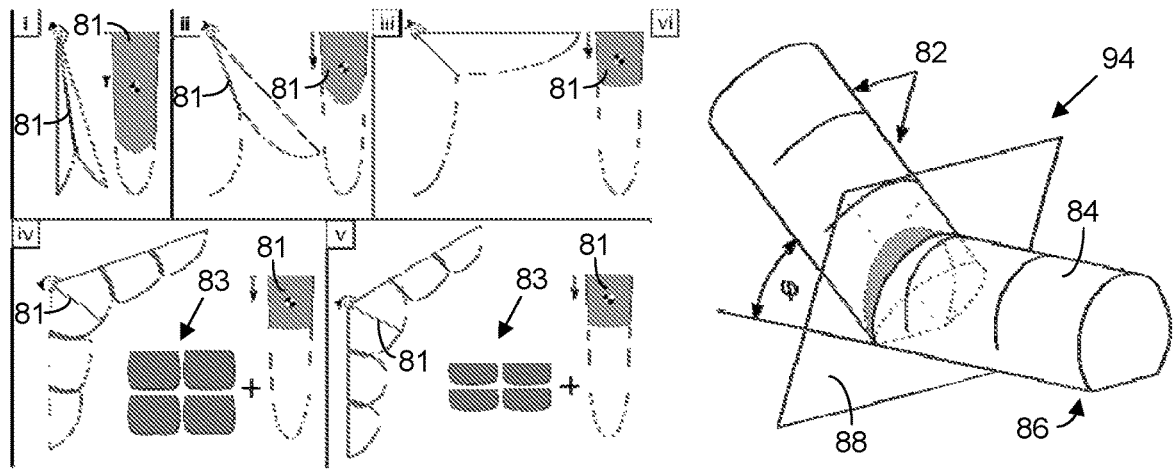
FIG. 60 includes images i-v, which show phases of inflations of a sample five-segment, 180° pattern angle actuator. Crosshairs indicate the centroid of the FMOA. Image vi labels the components of the five-segment actuator and shows the intersecting volume.

When the actuator of FIG. 60 is folded in two and inflated, it can be considered as a bellows with a varying cross-sectional area (CSA) and moment arm. The product of this area and moment arm forms the first moment of area (FMOA) 81. The torque output of the actuator may then be calculated as the product of the FMOA 81 and the internal pressure of the actuator. The CSA is estimated to be the area of the deformed actuator that intersects a plane bisecting the bent, deformed actuator (as seen in image vi of FIG. 60, where the deflection angle, $\phi$, at the intersection plane 88 of an actuator 94 with segments 82, a belly 84, and a spine 86, is shown). This area includes the contact of the belly 84 of the actuator 94 with itself.

On either side of this bellows is an inflatable beam that assists with force transmission and force distribution. As the actuator continues to inflate and unfold, the self-contact between the belly 84 of the actuator decreases, resulting in a decrease in the FMOA 81 while the effective length of the inflatable beams increase. For the case of a cylindrical beam, the FMOA 81 decreases monotonically as the actuator 94 unfolds. When the actuator reaches its equilibrium shape (as seen in image iii of FIG. 60), the net moment generated by the actuator becomes zero.

The actuator shown in image iii of FIG. 60 is patterned to reach equilibrium at approximately 90°. Pattern angle can control the ROM of the actuator, preventing over-actuation of a joint. As the actuator approaches its patterned equilibrium angle, the stresses in the textile begin to generate a counter moment to react against the FMOA moment, reducing the moment output of the actuator. At the actuator's pattern angle, the moment generated by the FMOA of the actuator is balanced by the stress-induced counter-moment in the textile, resulting in zero net torque output about the center of rotation.

Figure 61:
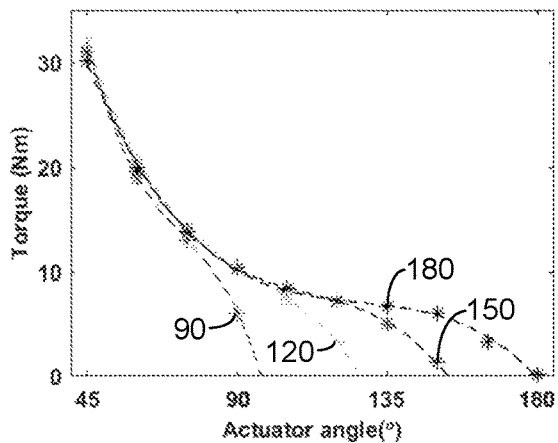
FIG. 61 includes plots that show the changing pattern angle and equilibrium effect for actuators at different angles.

FIG. 61 illustrates the torque profile for a range of cylindrical actuators of equal radius but varying pattern angles (i.e., 90°, 120°, 150°, and 180°—each labeled by degree) at a pressure of 136 kPa (20 psi). At small angles, when the actuator is more folded, the torque generated by the actuator is typically greater due to an increased FMOA 81. The torque response of the actuators is consistent between the actuators due to their equivalent radii. For this particular test, when the actuation angle approached ~80% of the pattern angle, the torque response began to drop as the equilibrium counter moment became significant.

Excessive patterning beyond the required ROM of the actuator results in additional material being present in the actuator. This material remains unstressed for a greater portion of the actuators ROM, and due to the inherent lack of bending stiffness of textiles, can move freely while unstressed. This free motion adds compliance to the intersectional area of the actuator, allowing the actuator to more readily become misaligned at lower angles and thus reduce the torque output of the actuator.

The actuator in image iv of FIG. 60 has a base pattern angle of 90° but is also divided into five segments 82. Once the actuator reaches the nominal equilibrium angle defined by the pattern angle, the ends of the segments begin to round and push apart, increasing the ROM of the actuator. The FMOA 81 of the bisected actuator remains constant (see image iv of FIG. 60) while the rate of change in contact area between the rounded segment ends 83 (image v of FIG. 60) is less abrupt than that of the equilibrium effect, resulting in a more-gradual decrease in torque, leading to a more-linear torque-to-angle response. The three-dimensional (3D) structure created by the segments limits the free motion of the textile in the intersection area, limiting the additional compliance introduced by additional material.

Figure 62:
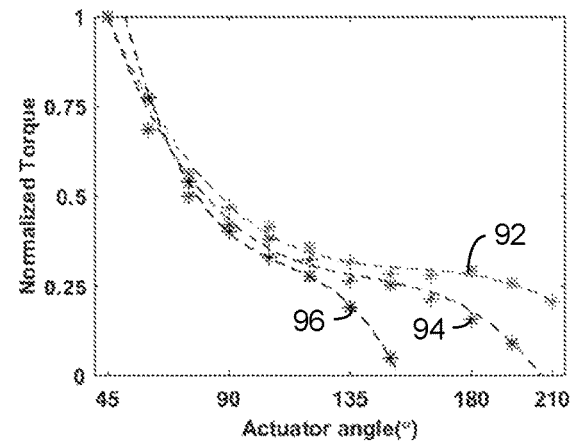
FIG. 62 includes plots that show the actuator segmentation effect on linearity and ROM.

FIG. 62 illustrates both the effect of segmentation on the ROM and on the linearity of the torque-to-angle relationship at constant pressure. An unsegmented, 150° actuator 92 acts as the baseline for comparison. When broken into a five-segment actuator 94 with a 150° base pattern, the actuator's ROM increases by ~60° to ~210°. When the segmented actuator 94 is compared to an unsegmented actuator 92 with an equivalent pattern angle (210°), the segmented actuator 94 has a more-linear torque-to-angle relationship when compared to the relatively abrupt drop in torque due to equilibrium in the unsegmented version 92. The segmented base angle 96 is also plotted.

High-stiffness textiles are used to constrain the final inflated geometry of the actuators. The use of high-stiffness textiles reduces the elastic deformation of the actuator, resulting in an actuator geometry that remains relatively constant as the internal pressure varies, unlike an elastomeric actuator.

A stiff textile may be defined as a textile that stretches less than or equal to 25% under a uniaxial tensile load of 450 Newtons along any of its yarn family orientations with a sample width of 70 mm and length 110 mm. The test is to be carried out a constant rate of extension. The specimen is clamped by wavy grips that are sufficiently wide to engage with the entire width of the test specimen to a depth of 35 mm each. Stretch is defined as the change in gauge length with respect to the original gauge length of 40 mm of the specimen under test. A yarn family orientation of the textile may include, but is not limited to, the direction of the warp, weft, course or wale of the textile.

Figure 63:
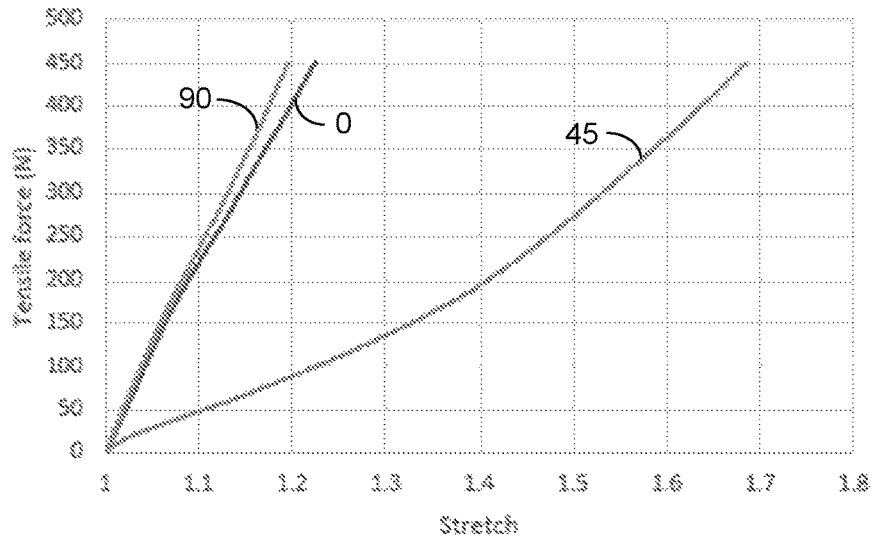
FIG. 63 plots stretch versus tensile force at different angles of yarn orientation.

For the textile characterized in the graph of FIG. 63, the yarn family orientations of the textile (woven) are the warp and weft directions, which correspond to 0° and 90° in this plot (plotted with angles indicated in degrees). At 45°, which is not a preferred direction, the stiffness of the textile is significantly lower than the stiffness in either of the yarn family orientations.

The stiffness in the various yarn family direction need not be equivalent, as is the case with two-way stretch textiles that may be significantly stiffer in one yarn family orientation compared to the other. The final specimen size is 70 mm×(35+40+35) mm.

Medical Arm-Assistance Device

Herein, we describe a device designed to assist users who are suffering from weakness or paralysis of the arm including shoulder, elbow, wrist and hand, which may also be used as a tool in rehabilitation exercises. In some embodiments, the device may consist of one actuator for one joint, multiple actuators for one joint, or multiple actuators for multiple joints. The users may have had a stroke or injury to the spinal cord or may have muscular dystrophy, ALS or other neurological or orthopedic conditions. Moving the arm is a crucial element in performing activities of daily living (ADLs), which may otherwise be difficult or impossible. Ability to perform ADLs is linked to health and life expectancy and is shown to greatly improve quality of life for impaired populations.

Particular concerns taken into account for the device include (a) comfort for the wearer, (b) the ability to be worn discreetly, (c) no hindrance when not in use, and (d) ease of donning/doffing with assistance from a caregiver. The actuators described herein are integrated into the device to assist with shoulder movement, with the specific movements generated by the actuators being a function of their location, orientation and attachment of the integrated actuators on the device.

Figure 64:
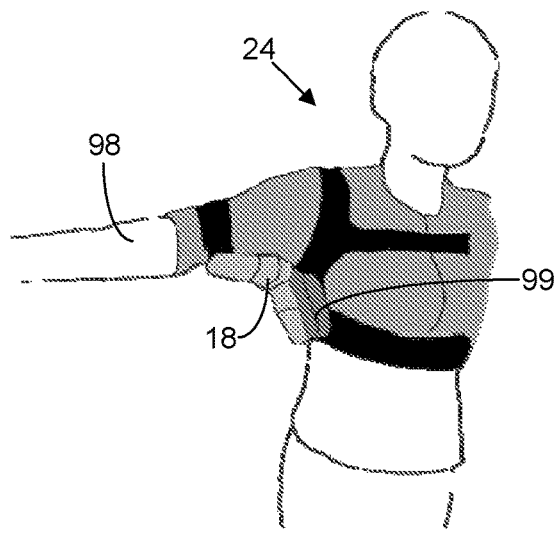
FIG. 64 shows an abduction actuator 18 attached laterally to the torso and medially under the arm 98.
Figure 65:
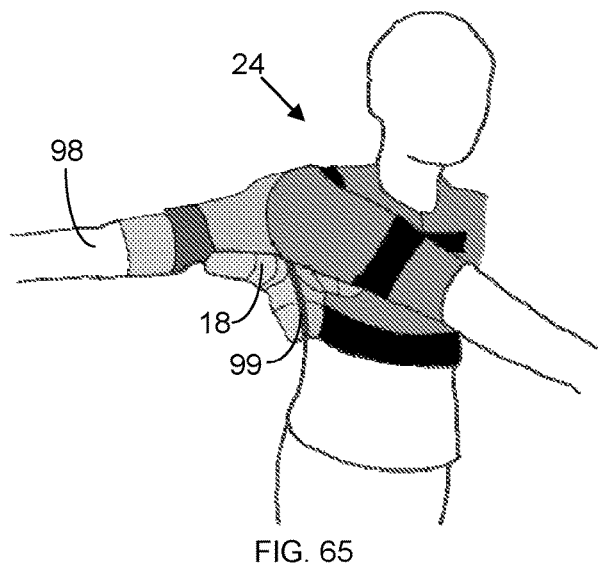
FIG. 65 shows the abduction actuator 18 abducts the arm 98 and is able to rotate on its longitudinal axis by means of a fabric "hinge" 99 into a forward flexion position.

Actuation:

The abduction actuator (ABA) 18 is attached to the lateral side of the body, under the arm 98, at or just forward of the frontal plane, and extends across the axila to attaching to the medial side of the arm 98, as shown in FIG. 64. The ABA's natural movement is to lift the arm against gravity, by abduction, flexion or some combination thereof as seen in FIG. 65. The actuator 18 is attached to the torso by soft hinge 99 (e.g., a single seam), allowing for rotation about the longitudinal axis. The ABA 18 creates motion by generating a torque when pressurized to lift the arm 98. The ABA 18 is designed to have an inflated shape, which is patterned for an angle (e.g., 135 degrees) higher than a desired angle (e.g., 90 degrees) to account for compliance in user interface and actuator materials. Patterning the actuator 18 to be angled allows the actuator 18 to conform closer to the axilla (FIG. 64), reducing the visual outline of the device.

Figure 66:
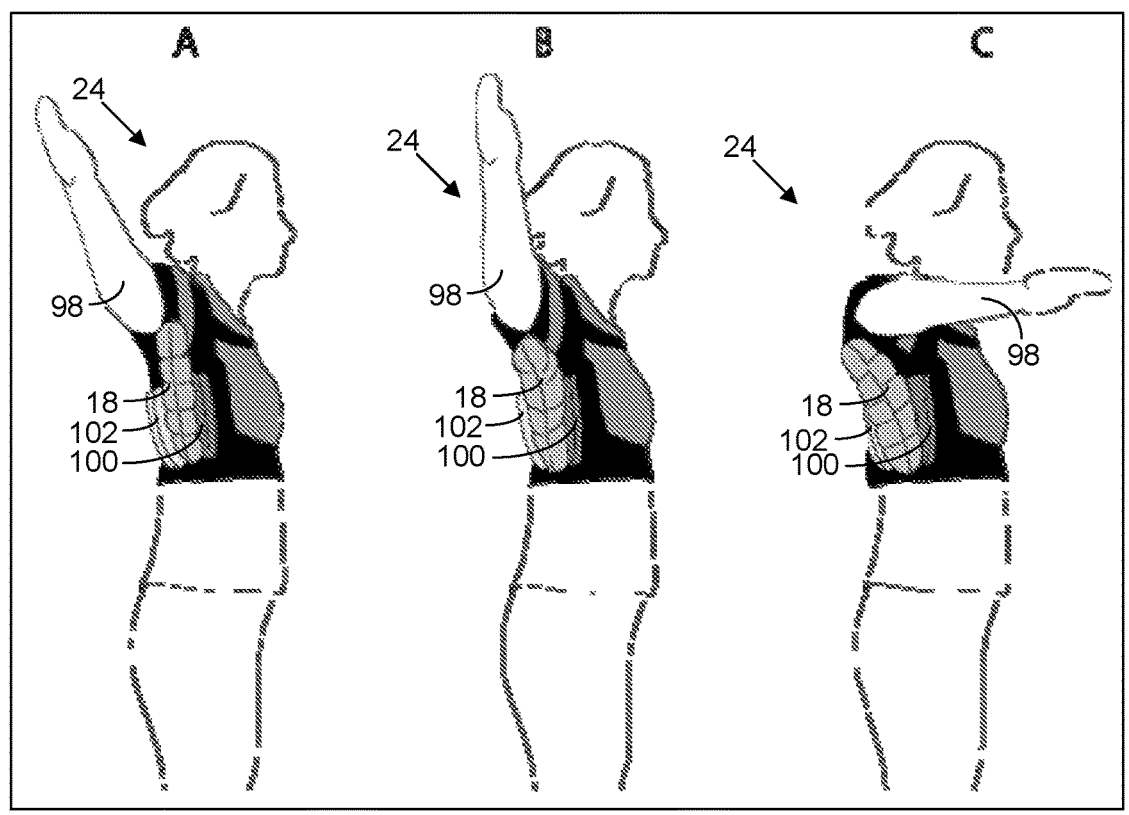
FIG. 66 illustrates that, depending on where the abduction actuator 18 is attached to the arm 98, the abduction actuator 18 will generate external rotation (attached anteriorly), as shown in image A; no rotation, as shown in image B, or internal rotation (attached posteriorly), as shown in image C.

Internal and external rotation of the arm 98 may also be controlled by the ABA 18. Rotational control can be achieved passively by biasing the attachment of the ABA 18 on the upper arm. If the attachment is biased towards the anterior of the arm 98, as shown in image A of FIG. 66, an external rotation is caused during abduction; and, if the bias is towards the posterior of the arm 98, as shown in image C of FIG. 66, an internal rotation is caused. Rotation can also be actively controlled by differential inflation of a bifurcated ABA 18 where one arm of the actuator 18 is located anteriorly and the other posteriorly.

Figure 67:
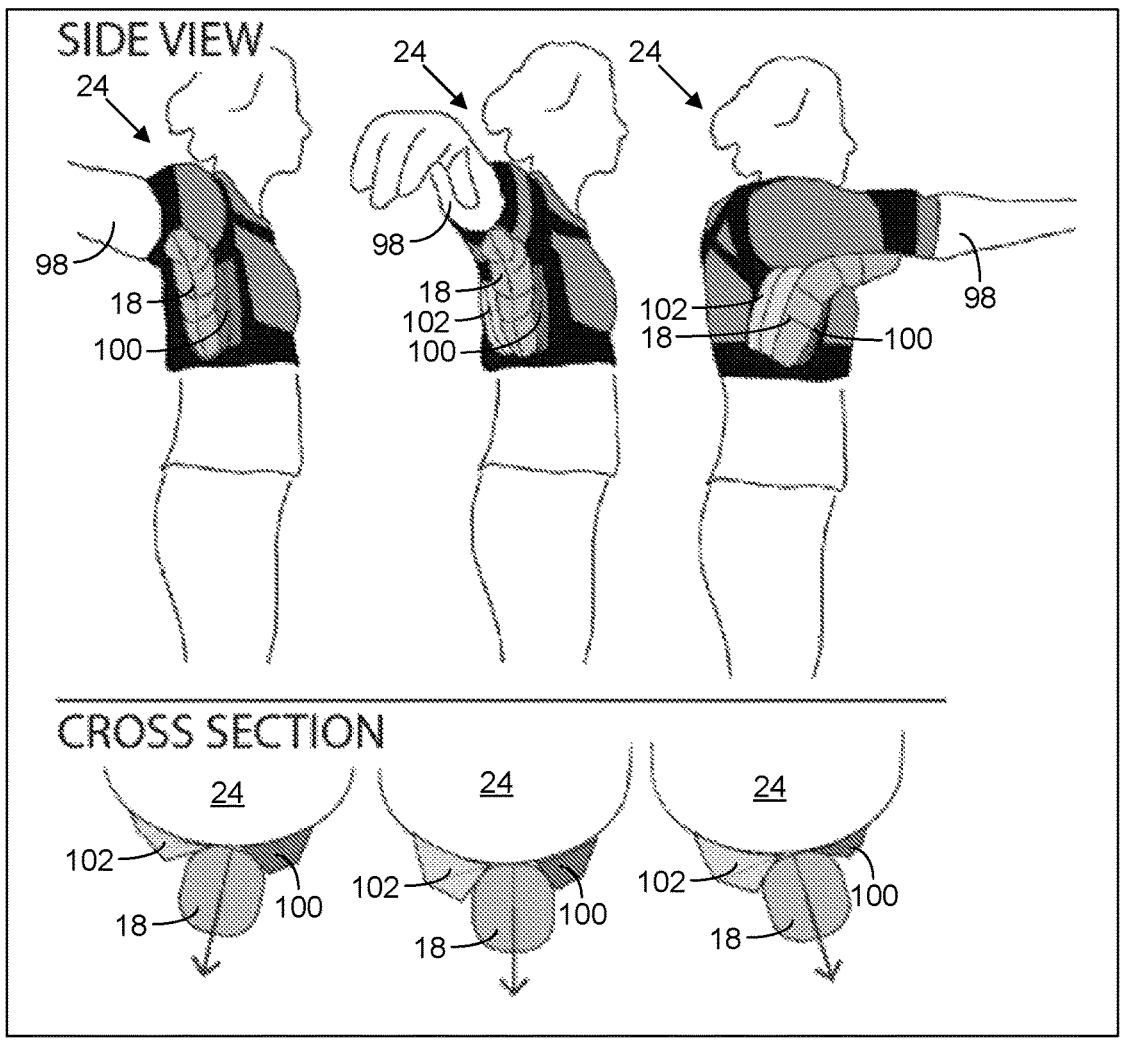
FIG. 67 shows the abduction actuator 18 and the wearer's arm 98 being moved by the lower extension actuator (LEA) 100 and the lower flexion actuator (LFA) 102 co-inflating/deflating to adjust arm angle.

The lower extension actuator (LEA) 100 and lower flexion actuators (LFA) 102 determine the ABA's degree of rotation around its hinge-seam, as shown in FIG. 67 These actuators are an antagonistic pair which are located on either side of the ABA 18 and which co-inflate to position the ABA 18, determining its degree of rotation between the frontal and sagittal planes. The LEA 100 is therefore located on the anterior side of the ABA 18 and the LFA 102 is located posteriorly. The LEA 100 and LFA 102 create motion by expanding between the torso and the inflated ABA 18 pushing the ABA 18 (and thus the user's arm 98) to rotate about the ABA's hinge.

Figure 68:
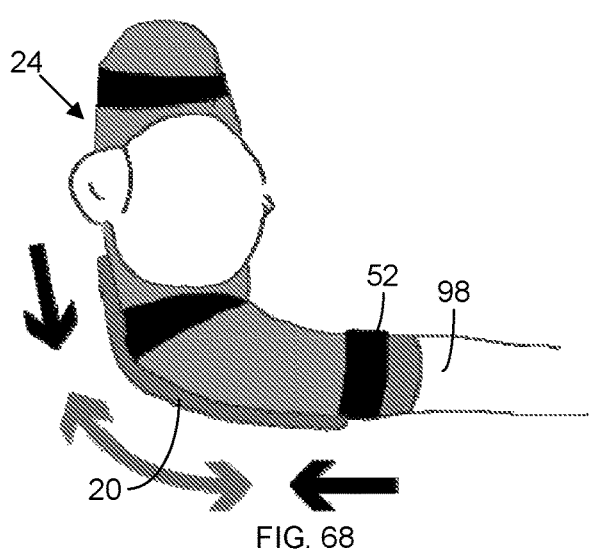
FIG. 68 shows a horizontal flexion actuator (HFA) 20 pushing the arm 98 in horizontal flexion; these forces are reacted by the shoulder harness and arm cuff 52.

The horizontal-flexion actuator (HFA) 20 pushes the arm forward into horizontal-flexion once the arm 98 is partially or fully abducted, as shown in FIG. 68. The HFA 20 extends from the user's back (above the scapula) across the shoulder and onto the posterior side of the arm 98; parallel to the transverse plane when the arm 98 is abducted. The HFA 20 is patterned to both bend and extend when inflated thereby pushing the arm 98 forward (extending) and accommodating the curve of the shoulder as the arm 98 flexes (bending). In order to allow an actuator, made of low-stretch textile, to have significant properties of extension, the actuator is gathered as it is being sewn onto the stretchable textile baselayer.

The elbow, having a single degree of freedom, requires an antagonistic pair of actuators 104 and 106 (FIG. 69) that can co-inflate in order to control the angle of elbow flexion; an elbow extension actuator (EEA) 104 and an elbow flexion actuator (EFA) 106. The EEA 104 consists of an extending actuator located across the elbow joint on the anterior side of the arm 98. The EFA 106 consists of a bending or bending/extending actuator located across the elbow joint on the posterior side of the arm 98.

Actuators around the wrist create motion using two antagonistic pairs (FIG. 69), one pair for flexion 110 and extension 108 another pair for radial/ulnar deviations. All such actuators applying force to the hand through bending or bending/extending motions. Extension and flexion actuators 108 and 110 are located across the wrist joint on the anterior and posterior sides respectively. Radial and ulnar deviation actuators are mounted on the medial and lateral sides respectively.

Anchoring:

These actuators apply forces to the arm, which must be reacted on the body, thereby requiring an anchoring system.

The anchoring principle for the shoulder is as follows: two stable harnesses (serving as a vest 50) positioned around the shoulders provide the main anchoring points. The shoulders are ideal anchoring points in that they can sustain loads and do not change significantly in circumference. Crossed back straps 116 and a front sternum strap 118 link the two shoulder harnesses, as shown in FIG. 70, which shows a harness formed of an inextensible woven fabric 112 and a comparatively stretchable fabric 14. These straps 116 and 118 help to further stabilize the harnesses and distribute forces across both of them.

As shown in FIG. 71, the position of the ABA 18 supporting the weight of the arm 98 creates two main forces that need to be reacted: a vertical force and a horizontal force. The vertical force is reacted by sewing the actuator 18 to a patch of inextensible fabric reinforced with semi rigid plastic directly stitched to the shoulder harness. Therefore, the vertical force is distributed to this shoulder harness and to the other harness through the different straps. The horizontal force is reacted by a horizontal strap 130 at the base of the semi-rigid patch. Abduction forces on the upper arm are reacted primarily through an arm cuff (wrap) 52, as shown in FIG. 72. The arm cuff 52, which attaches to the relatively featureless upper arm, relies on a non-slip material 120 inside an adjustable-diameter cuff 52. During abduction, this cuff 52 ensures that the ABA 18 remains stable relative to the arm 98 and that the arm's weight remains on top of the actuator 18. In the case where the ABA 18 is used to also control rotation, the cuff 52 also serves to translate the upward abduction force from the ABA 18 into a rotational force, as well.

As shown in FIG. 68, forces generated by the HFA 20 are reacted by the shoulder harness and the arm cuff. In this case, the cuff translates axial extending forces generated by the HFA 20 into shear forces on the upper portion of the arm 98.

The LFA 102 and LEA 100 are attached directly to the same semi-rigid plate onto which the ABA 18 is also attached. Forces are reacted against the plate, which rests against the torso, as shown in FIG. 67.

Elbow actuators 104 and 106 anchor to the body in a manner similar to the upper arm cuff 52 using two adjustable and non-slip cuffs 52 attaching above and below the elbow. These cuffs 52 translate rotational torques into shear forces on the upper and lower arm segments, as shown in FIG. 69.

Figure 69:
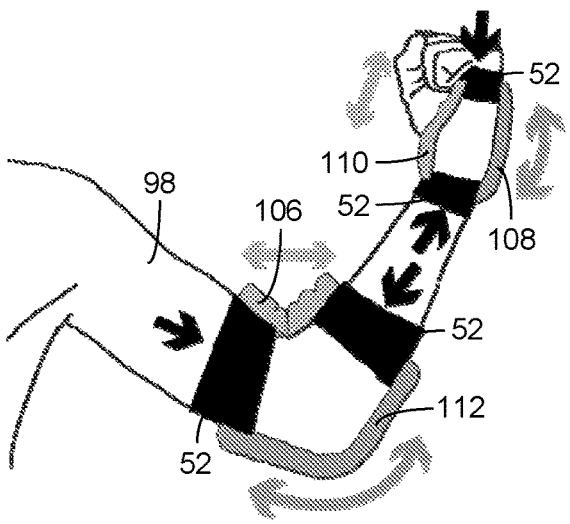
FIG. 69 shows an actuator configuration for the arm 98 with two antagonistic pairs of actuators controlling the elbow and wrist joints. The actuators include flexion actuators 106 and 110 and extension actuators 104 and 108 for their respective joints. The forces generated by these actuators 104, 106, 108, and 110 are reacted by arm cuffs 52.
Figure 76:
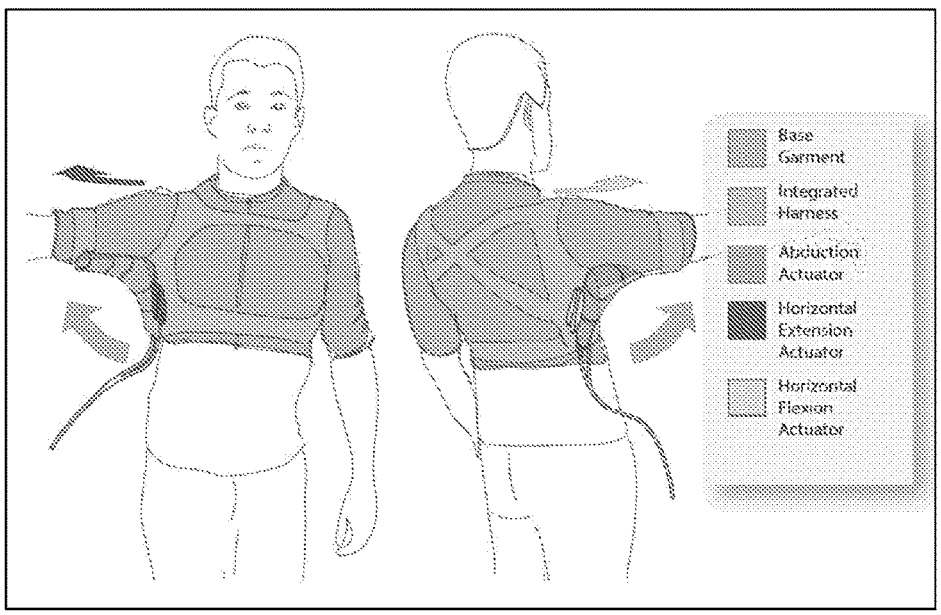
FIG. 76 shows a shoulder actuation system including an abduction actuator, a horizontal extension actuator, and a horizontal flexion actuator.
Figure 77:
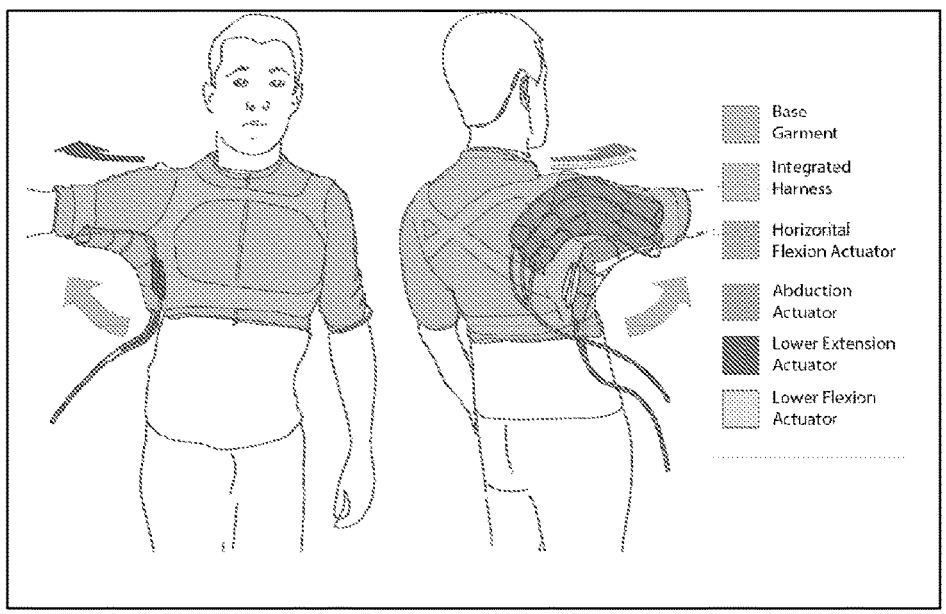
FIG. 77 shows a shoulder actuation system including an abduction actuator, a horizontal flexion actuator, a lower extension actuator, and a lower flexion actuator.
Figure 78:
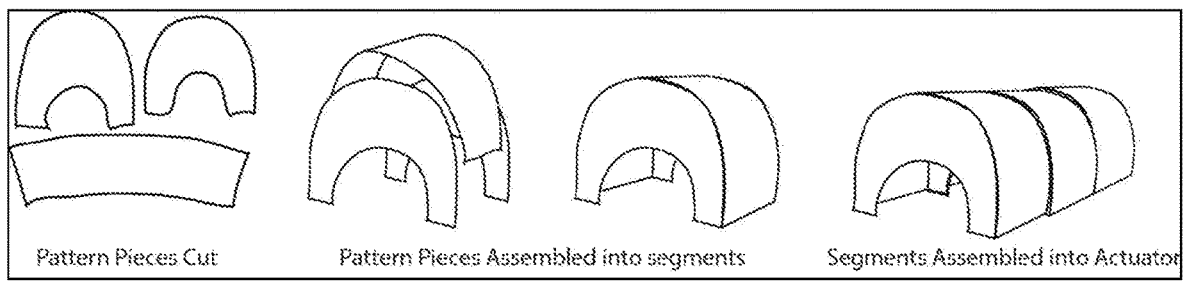
FIG. 78 shows pattern pieces for a textile envelope for a segmented actuator.

Wrist actuators 108 and 110 again rely on a cuff 52 that wraps around the distil end of the lower arm segment and a glove or cuff 52 that wraps around the hand, as shown in FIG. 69.

Distributed Actuation

Both rigid and soft wearable robots typically use a single actuator or pair of antagonistic actuators to control a single degree of freedom in a joint. This discreet actuation scheme can be limiting in that it does not closely relate to actual human movement, which uses continuously varied combinations of muscles to create fluid and controlled movements. Furthermore, in soft devices, alignment of a discreet system becomes crucial to its performance and is under constant risk of being improperly worn or "drifting" during use. A garment 128 with a distributed array of actuators 124, as shown in FIG. 73, is not reliant on the accurate placement or alignment of any one actuator, thus accommodating for any misalignment of the device on the body and allowing for smooth and variable control over the arms motion. Described below is a distributed actuation device to control motion in the shoulder, elbow and wrist joints through selective pressurization of actuators.

A distributed actuation device is particularly useful for the shoulder and wrist joints, which have large ranges of motion and multiple degrees of freedom. A device for the shoulder may consist of a plurality of actuators generating various types of motion and applying various forces about the joint depending on their relative location.

For example, an array of actuators 124 located laterally on the torso beneath the arm may be patterned to unfold and lift the arm as they are pressurized. An array of actuators 124 in front of and behind the arm may be designed such that they may expand or contract depending on input pressures, and an array of actuators 124 on top of the arm may generate additional lifting force. These forces, in turn, are reacted by a harness system similar to those described in the medical and industrial application descriptions, wherein a shirt-like garment 128 made of stretchable fabric is integrated into a harness system constructed of a stiffer textile that attaches securely about the shoulders, across the back, sternum and ribs of the wearer. Such an anchoring system 122 transfers forces from the actuator 124 to the arm and torso to create movement of the arm.

Such a device may be instrumented with a variety of distributed sensors 126 including, but not limited to pressure sensors both for internal actuator pressure and contact pressure between the user and the garment, strain sensors to determine geometric changes of the actuators and the wearer, or IMUs to determine joint segment angles. These sensors 126 may provide data that may be utilized for tracking device usage or to assist with the control of the device. Such sensing systems may also function to alert control algorithms of system drift and alignment issues and automatically correct for these issues.

Industrial Shoulder Assistance

An industrial exosuit can reduce the shoulder fatigue of workers performing sustained overhead tasks. Such tasks are common in industrial assembly lines and are cyclically repeated for hours on end, increasing the risk of injury as workers become fatigued. Ergonomic rules from certain manufacturers consider it a risk factor to maintain the arm at over 60° flexion, and even more above 90°. Ergonomic rules also limit shoulder flexion to a duration of 10 seconds. Both of these ergonomic rules about flexion angle and duration are often broken in manufacturing settings in order to improve efficiency thereby exposing workers to increased risks of fatigue and injury.

The industrial exosuit can meet the following criteria: comfortable to wear all day, allows free range of motion when unpowered, allows sufficient range of motion to perform task when powered, includes fully soft distal components, includes a compact proximal power source, requires minimal management throughout a shift, fast to don/doff.

The industrial shoulder device consists of a pushing architecture as shown in FIG. 74, with a semi-active assistance scheme, and inflatable actuators 18.

A semi-active assistance means that the device doesn't actively help the arm to get into a raised position, but rather supports the arm only after it is raised. Due to the prolonged periods of uninterrupted shoulder flexion often required for manufacturing and other applications, such an assistance can be very useful, even if there is a lag between the user lifting his or her arms and the device supporting them.

The actuator can be attached via a hinge seam, as shown in FIGS. 64 and 65, and anchored as shown in FIGS. 70 and 71. FIG. 75 shows the anchoring system of the shoulder harness integrated on a garment and including a horizontal strap 130 for reacting the horizontal force of the actuator.

Actuators for this device are able to support the arm within a full range of motion necessary for manufacturing tasks, for example between 60 and 150 degrees. As described, above, the device and actuators can be instrumented with a variety of sensors including, but not limited to, pressure sensors both for internal actuator pressure and contact pressure between the user and the garment, strain sensors to determine geometric changes of the actuators and the wearer, or IMUs to determine joint segment angles.

These sensors may provide data which may be utilized for tracking device usage or to assist with the control of the device. When the control system detects a sensor signal from any number of sensor that indicates that the user's arm or arms have been raised, the system may react automatically to inflate the actuators and support the overhead work. The system may also detect any sensor signals that the user wants to lower their arm or arms and deflate sufficiently quickly such that the users natural motion is minimally impeded.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A textile actuator assembly, comprising:
    a plurality of textile envelopes, each of which defines a chamber that is made fluid-impermeable by at least one of:
    (a) a fluid-impermeable bladder contained in the textile envelope; and
    (b) a fluid-impermeable structure incorporated into the textile envelope; and
    at least one garment configured to be worn on a wearer's arm and to be worn on the wearer's torso under the wearer's arm when the wearer is upright,
    wherein each textile envelope has a pre-determined geometry in its equilibrium state that is configured to produce a displacement mostly via a change in geometry between an uninflated shape and the predetermined geometry of its equilibrium state after inflation due to displacement of the textile envelope rather than via stretching of the textile envelope during a relative increase in pressure inside the chamber, and
    wherein the textile envelopes include:
    (I) an abduction textile envelope with a first end and a second end, wherein the first end of the abduction textile envelope is secured to the garment configured to be worn on the wearer's torso under the wearer's arm, and wherein the second end of the abduction textile envelope is secured to the garment configured to be worn on the wearer's arm; and
    (II) at least one of the following horizontal textile envelopes:
       (i) a horizontal-flexion textile envelope including a first end and a second end, wherein the first end is secured to a front side of the garment configured to be worn on the wearer's torso under the wearer's arm, and wherein the second end of the horizontal-flexion textile envelope is mounted against the abduction textile envelope or against an arm of the wearer and is configured, when inflated, to displace the abduction textile envelope and the arm toward the rear side of the garment configured to be worn on the wearer's torso under the wearer's arm; and
       (ii) a horizontal-extension textile envelope including a first end and a second end, wherein the first end is secured to a rear side of the garment configured to be worn on the wearer's torso under the wearer's arm, and wherein the second end of the horizontal-extension textile envelope is mounted against the abduction textile envelope or against the arm of the wearer and is configured, when inflated, to displace the abduction textile envelope and the arm toward the front side of the garment configured to be worn on the wearer's torso under the wearer's arm.

2. The textile actuator assembly of claim 1, wherein the abduction textile envelope is substantially inextensible.

3. The textile actuator assembly of claim 2, wherein the abduction textile envelope comprises multiple yarn families, and wherein substantially inextensible means the textile envelope stretches less than 25% under a uniaxial tensile load of 450 Newtons along any yarn family orientation per a sample width of 70 mm and a gauge length of 40 mm.

4. The textile actuator assembly of claim 1, wherein the abduction textile envelope comprises multiple yarn families, and wherein the at least one textile envelope stretches by no more than 10% in a primary fiber direction when the fluid is pumped into the chamber under a uniaxial tensile load of 450 Newtons along any yarn family orientation per a sample width of 70 mm and length 110 mm.

5. The textile actuator assembly of claim 1, wherein the pre-determined geometry of the abduction textile envelope includes a plurality of path-lengthening textile features, and wherein the abduction textile envelope is configured to provide a majority of the displacement via extension of the path-lengthening textile features of the abduction textile envelope when actuated via the relative increase in pressure in the chamber.

6. A textile actuator assembly of claim 4, wherein the path-lengthening textile feature is in the form of a patterned geometry.

7. The textile actuator assembly of claim 6, wherein the patterned geometry includes at least one feature selected from gathers, pleats, folds, and darts.

8. The textile actuator assembly of claim 1, wherein the predetermined geometry of the abduction textile envelope is designed to produce a nonlinear relationship between the torque of the abduction textile envelope and the displacement of the abduction textile envelope over greater than 50% of the range of displacement.

9. The textile actuator assembly of claim 1, wherein the textile actuator assembly includes at least one inclusion that is substantially stiffer than a textile of which the abduction textile envelope is comprised and that is configured to constrain displacement of the abduction textile envelope.

10. A method for actuator-facilitated motion, comprising:
utilizing the textile actuator assembly of claim 1, wherein the abduction textile envelope is worn by a user with the first end of the abduction textile envelope secured to the garment on the user's torso under the user's axila and with the second end of the abduction textile envelope secured to the garment on an underside of an upper portion of the user's arm;
delivering a fluid into or out of the chamber of the abduction textile envelope to displace the abduction textile envelope primarily by transitioning from an uninflated state to the pre-determined geometry due to displacement of the abduction textile envelope rather than via stretching or contraction of the abduction textile envelope;
at least one of (a) abducting or adducting the arm of the user via the displacement of the abduction textile envelope and (b) supporting and holding the arm of the user in an abducted position with the abduction textile envelope in a pressurized, stiffened state; and
rotating the arm of the user via a degree of freedom distinct from abduction and adduction via delivery of the fluid into or out of the chambers of the abduction textile envelope and the at least one horizontal-flexion/extension textile envelope.

11. The method of claim 10, wherein the fluid is delivered to the chamber of the abduction textile envelope after the user has moved the arm to a desired abducted position where support is needed.

12. The method of claim 10, wherein the arm is displaced at a specific non-180° angle by delivering the fluid to the chamber of the abduction textile envelope to reach the abduction textile envelope's equilibrium state, the method further comprising stopping further displacement of the arm beyond the specific angle by the pre-determined geometry of the abduction textile envelope.

13. The method of claim 10, wherein the user wears
the horizontal-flexion textile envelope mounted on one side along the user's torso in front of the abduction textile envelope and on another side to the abduction textile envelope; and
the horizontal-extension textile envelope mounted on one side along the user's torso behind the abduction envelope and on another side to the abduction textile envelope in an antagonistic configuration with the horizontal-flexion textile envelope,
wherein the fluid is delivered into the abduction textile envelope to rotate the arm upward, and
wherein the fluid is delivered into or out of the horizontal extension/flexion envelopes to horizontally rotate the arm forward or backward.

14. The method of claim 13, wherein the textile envelopes are mounted to a vest worn by the user.

15. The method of claim 14, wherein the abduction textile envelope is mounted along the upper portion of the user's arm via a wrap encircling the upper portion of the user's arm.

16. The method of claim 14, wherein a linkage is mounted to the vest and to the abduction textile envelope to constrain displacement of the abduction textile envelope.

17. The method of claim 14, wherein the chamber of the abduction textile envelope is segmented, and wherein the abduction textile envelope comprises a spine including at least two plates that help resist misalignment of the chamber segments and a textile that contains the plates and extends between them to act as a hinge.

18. The method of claim 14, wherein the horizontal-extension/flexion envelopes each comprise:
two wedge-shaped chambers in series fluid communication with a fluid supply; and
a plurality of plates positioned between and about the two wedge-shaped chambers,
wherein the wedge-shaped chambers, plates and a linkage mounted to the abduction textile envelope form a 4-bar linkage that transmits compressive force to the abduction textile envelope when at least one of the horizontal extension/flexion envelopes is inflated.

19. The method of claim 10, wherein the arm is displaced at a specific angle by actuating the textile actuator assembly via the fluid delivery to reach its equilibrium state, the method further comprising stopping further displacement of the arm beyond the specific angle by the pre-determined geometry of the abduction textile envelope to prevent excessive displacement of the abduction textile actuator to a degree that over-extends the arm or a joint formed by the arm.

20. The method of claim 10, further comprising fluctuating a fluid pressure over a pressure range that extends above and below a wrinkling pressure of the abduction textile envelope in order to leverage specific stiffness characteristics for actuation and de-actuation of the abduction textile envelope.

21. The method of claim 10, wherein substantially inextensible means the abduction textile envelope stretches less than 25% under a uniaxial tensile load of 450 Newtons along any yarn family orientation per a sample width of 70 mm and length of 110 mm.

22. The method of claim 10, wherein the abduction textile envelope stretches by no more than 10% in a primary fiber direction when the fluid is pumped into the chamber.

23. The method of claim 10, wherein the textile envelope has different path lengths on opposite sides of the abduction textile envelope geometry includes at least one feature selected from gathers, pleats, folds, and darts that serve as a mechanical stop.

24. The method of claim 10, wherein the predetermined geometry includes at least one feature selected from gathers, pleats, folds, and darts that serve as a mechanical stop.

25. The method of claim 10, wherein the textile envelope stretches by no more than 2% in a primary fiber direction when the fluid is pumped into the chamber.

26. The method of claim 10, wherein the arm is displaced by the abduction textile envelope via axial contraction due to radial expansion of the abduction textile envelope.

27. The method of claim 10, wherein each chamber is made fluid-impermeable by the fluid-impermeable bladder contained in the respective textile envelope, and wherein the fluid-impermeable bladder is sized to be constrained by the respective textile envelope before the fluid-impermeable bladder can elastically deform.

28. The method of claim 10, wherein fluid is delivered into each chamber to partially pressurize the chamber and thereby partially stiffen each chamber.

29. The method of claim 10, wherein the abduction textile envelope is attached to the user via a vest that includes features for transferring forces from the abduction textile actuator to the user.

30. The method of claim 26, wherein the fluid is delivered to the abduction textile envelope after the user has moved the arm to a position where support is needed.

31. The textile actuator assembly of claim 1, wherein the at least one garment comprises:
   a vest; and
   an arm wrap, wherein
   the abduction textile envelope is mounted on one side to the vest and on another side to the arm wrap,
   wherein the predetermined geometry of the abduction textile envelope produces an equilibrium state at a non-180°-angle displacement and stops further displacement upon pressurization of the chamber.

32. The textile actuator assembly of claim 31, further comprising both of:
   the horizontal-flexion textile envelope mounted on one side to the vest on a first side of the abduction textile envelope and on another side to the abduction textile envelope; and
   the horizontal-extension textile envelope mounted on one side to the vest on a second side of the abduction textile envelope and on another side to the abduction textile envelope in an antagonistic configuration with the horizontal-flexion textile envelope,
   wherein the horizontal-extension/flexion textile envelopes each comprise a substantially inextensible textile envelope that defines a chamber that is made fluid-impermeable by at least one of: (a) a fluid-impermeable bladder contained in the substantially inextensible textile envelope and (b) a fluid-impermeable structure incorporated into the substantially inextensible textile envelope, wherein the substantially inextensible textile envelope has a predetermined geometry that produces an equilibrium state at a non-180°-angle displacement and that stops further displacement upon pressurization of the chamber.

33. The textile actuator assembly of claim 31, further comprising:
   a sensor positioned and configured to sense the abduction textile envelope or a wearer of the vest; and
   a controller configured to receive readings from the sensor and to communicate with a fluid source to command the fluid source to pump fluid into or out of the abduction textile envelope in response to readings from the sensor.

34. The textile actuator assembly of claim 1, wherein the at least one garment configured to be worn on a wearer's arm and to be worn on the wearer's torso is a single garment.

35. The textile actuator assembly of claim 1, wherein the at least one garment configured to be worn on a wearer's arm and to be worn on the wearer's torso includes distinct garments configured to be worn on the wearer's arm and to be worn on the wearer's torso under the wearer's arm.

36. The textile actuator assembly of claim 1, wherein the actuator assembly comprises both the horizontal-flexion textile envelope and the horizontal-extension textile envelope.

\* \* \* \* \*

UNITED STATES PATENT AND TRADEMARK OFFICE
CERTIFICATE OF CORRECTION

| | | |
|---|---|---|
| PATENT NO. | : 12,097,159 B2 | |
| APPLICATION NO. | : 16/614862 | |
| DATED | : September 24, 2024 | |
| INVENTOR(S) | : Walsh et al. | |

It is certified that error appears in the above-identified patent and that said Letters Patent is hereby corrected as shown below:

In the Claims

Column 28 Line 65, In Claim 6, replace "of claim 4" with --of claim 5--.

Column 31 Line 8, In Claim 30, replace "of claim 26" with --of claim 10--.

Signed and Sealed this
Fifth Day of November, 2024

Katherine Kelly Vidal
*Director of the United States Patent and Trademark Office*